United States Patent
Wengrovitz et al.

(10) Patent No.: US 7,852,859 B2
(45) Date of Patent: Dec. 14, 2010

(54) SYSTEM AND METHOD FOR INTERFACING LEGACY IP-PBX SYSTEMS TO SIP NETWORKS

(75) Inventors: Michael Wengrovitz, Concord, MA (US); Andrew Nelson, Lynnfield, MA (US)

(73) Assignee: Alcatel Lucent, Paris (FR)

( * ) Notice: Subject to any disclaimer, the term of this patent is extended or adjusted under 35 U.S.C. 154(b) by 1069 days.

(21) Appl. No.: 10/741,306

(22) Filed: Dec. 19, 2003

(65) Prior Publication Data

US 2004/0205209 A1    Oct. 14, 2004

Related U.S. Application Data

(60) Provisional application No. 60/437,216, filed on Dec. 31, 2002.

(51) Int. Cl.
   *H04L 12/56*    (2006.01)
(52) U.S. Cl. .................... 370/397; 370/401; 370/409; 370/410; 370/467; 370/475; 709/245; 709/246; 379/900
(58) Field of Classification Search .............. 370/351, 370/352, 464, 465, 466, 467, 353, 354, 355, 370/389, 392, 401; 379/242, 900; 709/246; 726/12
See application file for complete search history.

(56) References Cited

U.S. PATENT DOCUMENTS

| | | | | |
|---|---|---|---|---|
| 6,404,746 | B1 * | 6/2002 | Cave et al. | 370/262 |
| 6,834,294 | B1 * | 12/2004 | Katz | 709/203 |
| 7,058,082 | B1 * | 6/2006 | Bhat et al. | 370/466 |
| 7,447,804 | B2 * | 11/2008 | Koo | 709/246 |
| 2002/0110113 | A1 * | 8/2002 | Wengrovitz | 370/352 |
| 2002/0131575 | A1 * | 9/2002 | Gallant | 379/220.01 |
| 2002/0184376 | A1 * | 12/2002 | Sternagle | 709/230 |
| 2003/0072330 | A1 * | 4/2003 | Yang et al. | 370/493 |
| 2003/0091025 | A1 * | 5/2003 | Celi et al. | 370/352 |
| 2003/0093563 | A1 * | 5/2003 | Young et al. | 709/245 |

* cited by examiner

*Primary Examiner*—Kwang B Yao
*Assistant Examiner*—Jeffrey M Rutkowski
(74) *Attorney, Agent, or Firm*—Raymond M. Galasso; Galasso & Associates, LP

(57) ABSTRACT

A system and method for integrating a legacy IP-PBX to a session initiation protocol (SIP) network supporting one or more SIP sets. A SIP-PBX proxy server coupled to the legacy IP-PBX and the SIP network maintains a logical IP set for each SIP set on the SIP network. The logical IP set is configured to maintain IP-based signaling and media connectivity with the legacy IP-PBX. The SIP-PBX proxy server receives media directed to a logical IP set associated with a particular SIP set, and redirects the media to the particular SIP set. In doing so, the SIP-PBX converts messages that adhere to a private, vendor-specific protocol, to messages that adhere to the SIP protocol.

10 Claims, 34 Drawing Sheets

SYSTEM AND METHOD FOR INTERFACING LEGACY IP-PBX SYSTEMS TO SIP NETWORKS

CROSS-REFERENCE TO RELATED APPLICATION(S)

This application claims the benefit of U.S. Provisional Application No. 60/437,216, filed on Dec. 31, 2002, the content of which is incorporated herein by reference. This application also contains subject matter that is related to the subject matter disclosed in U.S. application Ser. No. 09/781,851, filed on Feb. 12, 2001, and U.S. application Ser. No. 10/289,547, filed on Nov. 6, 2002, the content of all of which are also incorporated herein by reference.

FIELD OF THE INVENTION

This invention relates generally to PBX systems, and more particularly, to interfacing legacy IP-PBX systems with SIP networks.

BACKGROUND OF THE INVENTION

Private Branch Exchange (PBX) systems often used by enterprises provide important communication features such as voicemail, speed dial, call transfer, conference, directory services, and the like. Connection between a PBX switch and one or more PBX sets is usually accomplished via a non-standard, vendor-specific, private-digital-signaling-and-voice (PDSV) protocol. This protocol exposes the various communication features offered by the PBX switch to each PBX set. One drawback in the use of PDSV protocols is that they are vendor-specific, and thus, often typically incompatible between different vendors. Consequently, an enterprise must typically purchase both the PBX and the PBX sets from the same vendor.

In the last few years, PBX system architectures have evolved from providing a direct digital connection with the PBX sets to providing a networked IP connection. However, the lack of interoperability between an IP-PBX from one vendor and the IP sets from another vendor has continued. Thus, if a customer purchases an IP-PBX from one particular vendor, he is still generally forced to choose IP sets from the same vendor, even if he prefers the style, look, or feel of IP sets from another vendor.

Recently, a new standard referred to as a Session Initiation Protocol (SIP) for IP session control has emerged from the Internet community, as set forth in Internet Engineering Task Force Request for Comment 2543 entitled "SIP: Session Initiation Protocol," March 1999 (hereinafter referred to as RFC 2543), which is incorporated herein by reference. The SIP protocol controls the setup, modification and teardown of general data exchange sessions, including Voice-over-IP (VoIP) sessions, between users on an IP network.

The emergence of the SIP protocol has given rise to a potential for an enterprise customer to purchase an IP-PBX manufactured by one vendor and SIP sets manufactured by other vendors. For example, an enterprise could potentially purchase an IP-PBX from one vendor based on the communication feature set and functionality included in the IP-PBX, and purchase SIP Sets having a preferred style or feel from another vendor. However, in order for this to occur, there exists a need to interface SIP sets to an IP-PBX that may not have native SIP support.

SUMMARY OF THE INVENTION

According to one embodiment, the present invention is directed to a data communications system integrating a voice switch adhering to a first protocol with a network of one or more first devices adhering to a second protocol. The system according to this embodiment includes a server coupled to the voice switch and the network of one or more first devices. The server maintains for at least one of the first devices a logical device adhering to the first protocol. The server further receives media directed to the logical device and redirects the media to the first device.

According to another embodiment, the present invention is directed to a server coupled between a voice switch adhering to a first protocol and one or more devices adhering to a second protocol. The server includes a means for receiving from the voice switch a first message indicative of a first communication port to be used by one of the devices for receiving media; means for receiving from the device a second message indicative of a second communication port to be used by the device for receiving the media; and means for reconciling a difference between the first communication port and the second communication port.

According to a further embodiment, the present invention is directed to a method for integrating a voice switch adhering to a first protocol with a network of one or more devices adhering to a second protocol. The method according to this embodiment includes receiving from the voice switch a first message indicative of a first communication port to be used by a particular device for receiving media; receiving from the particular device a second message indicative of a second communication port to be used by the particular device for receiving the media; and reconciling a difference between the first communication port and the second communication port.

According to one embodiment of the invention, the reconciling of the difference further comprises mapping the first communication port to the second communication port; receiving media addressed to the first communication port; and redirecting the media to the second communication port.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

Figure 1:
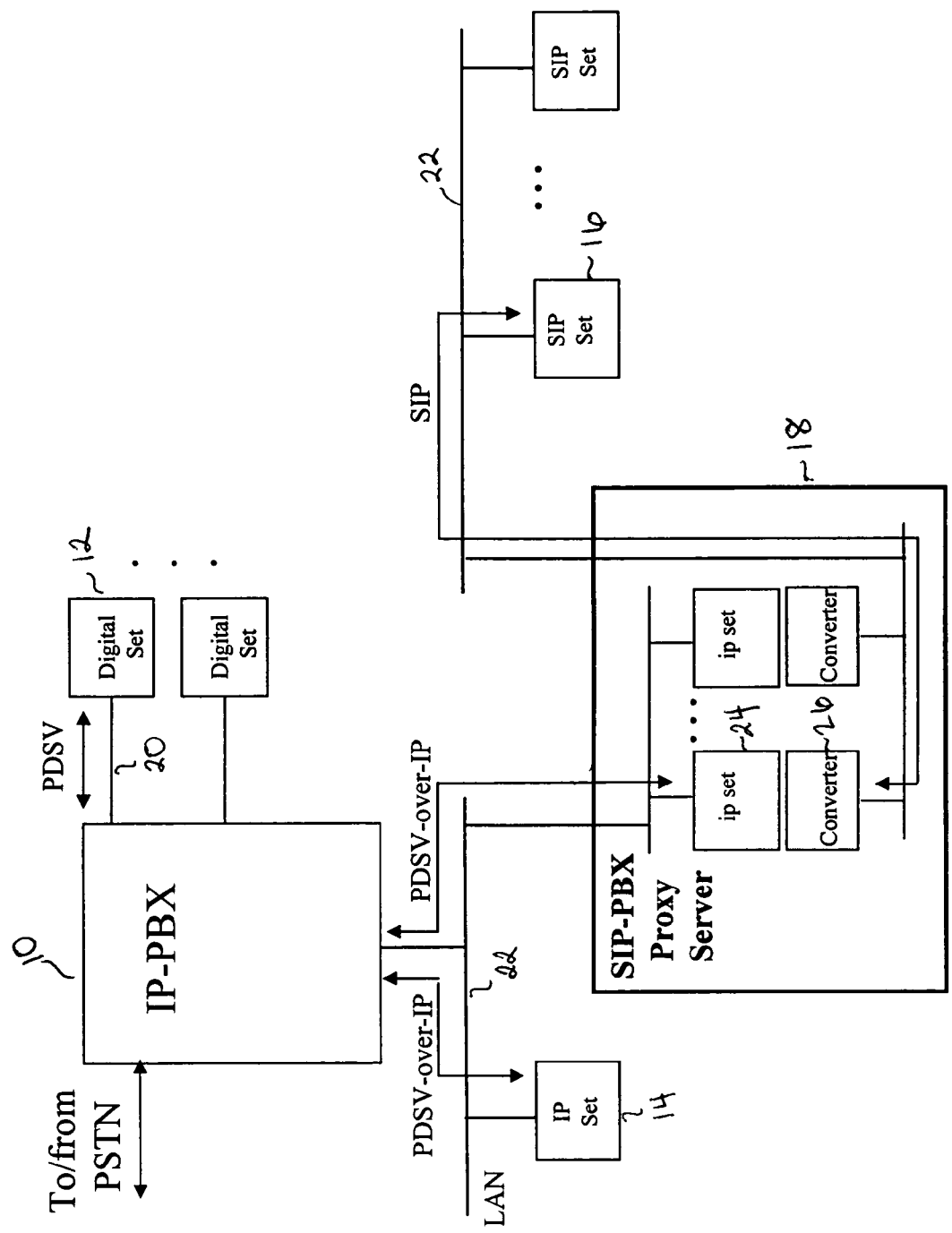
FIG. 1 is a schematic block diagram of a data communications system including a SIP-PBX proxy server according to one embodiment of the invention.

FIG. 1 is a schematic block diagram of a data communications system where the present invention may be practiced according to one embodiment of the invention. The system includes a voice switch, such as, for example, a networked private branch exchange switch (PBX), referred herein as an IP-PBX switch 10, in communication with various telephony devices, such as, for example, digital sets 12, IP sets 14, and SIP sets 16. The IP-PBX 10 may be one of various networked PBX switches conventional in the art, such as, for example, OmniPCX 4400 manufactured by Alcatel.

The IP-PBX 10 is coupled to each digital set 12 via a point-to-point wire 20 that transmits messages in accordance to the PDSV protocol. The IP-PBX 10 is also coupled to the IP sets 14 and SIP sets 16 over a data communications network 22, such as, for example, a local area network (LAN). The IP-PBX 10 transmits and receives PDSV messages using a network communications protocol such as, for example, an Internet protocol (IP). PDSV messages transmitted over the network 22 will hereinafter be referred to as PDSV-over-IP messages.

The digital sets 12 may take the form of any conventional digital telephony device capable of directly interfacing with the IP-PBX 10 using the PDSV protocol. The IP sets 14 may take the form of any conventional digital telephony device capable of interfacing with the IP-PBX 10 over the communications network 22 via PDSV-over-IP messages. The SIP sets 16 may take the form of any conventional digital telephony device configured with a SIP stack and taking the role of a SIP user agent as discussed in further detail in RFC 2543.

According to one embodiment of the invention, the interfacing of the IP-PBX 10 with the network of SIP sets 16 (also referred to as the SIP network) is accomplished via a SIP-PBX proxy server 18. The SIP-PBX proxy server 30 is configured to solve two main challenges in interfacing the network of SIP sets 16 to the IP-PBX 10.

A first challenge is that the IP-PBX 10 employs the PDSV protocol while the SIP sets 16 employ the SIP protocol.

A second challenge is the difference in the approach taken by the IP-PBX 10 and the SIP sets 16 in the setup and handling of voice media. In conventional IP-PBX systems, the PBX and IP sets operate in a master-slave mode where the PBX master set up the media flows between IP set slaves. It is generally the IP-PBX that informs each PBX set where to send its voice media, and on which port incoming media should be received. For example, when IP set A calls IP set B, the IP-PBX tells IP set A to send its media to IP set B port X1, tells IP set B to send its media to IP set A port X2, tells IP set A to receive its media on port X2, and tells IP set B to receive its media on port X1. Thus, the IP-PBX and the IP sets generally operate in a master-slave mode.

In contrast, SIP sets generally operate in a peer-to-peer mode without a master controller. For example, when SIP set C calls SIP set D, SIP set C transmits an INVITE message that contains the IP address and port on which SIP set C wants to receive media. SIP set D responds with an OK message that contains the IP address and port on which SIP set D wants to receive media. A more detailed description on voice media setup is disclosed in RFC 2543.

In order to reconcile the differences in the master-slave and peer-to-peer modes of handling media flows and properly interface the IP-PBX 10 to the SIP network, the SIP-PBX proxy server 18 maintains a logical IP set 24 for each SIP set 16 on the SIP network that maintains IP-based signaling and media connectivity with the IP-PBX 10. The logical IP sets 24 implement operations, such as handshaking and firmware download, typically implemented by physical IP sets. One or more converters 26 coupled to the logical IP sets 24 reconcile between the two modes of setup and handling of voice media, and relay media flows in such a way as to allow the IP-PBX 10 to think that it is the master, while also allowing the SIP sets 16 to think that they are operating in a peer-to-peer fashion. The one or more converters further translate between PDSV-over-IP messages received/transmitted from/to the IP-PBX 10, and SIP messages received/transmitted from/to a particular SIP set 16.

Figure 2:
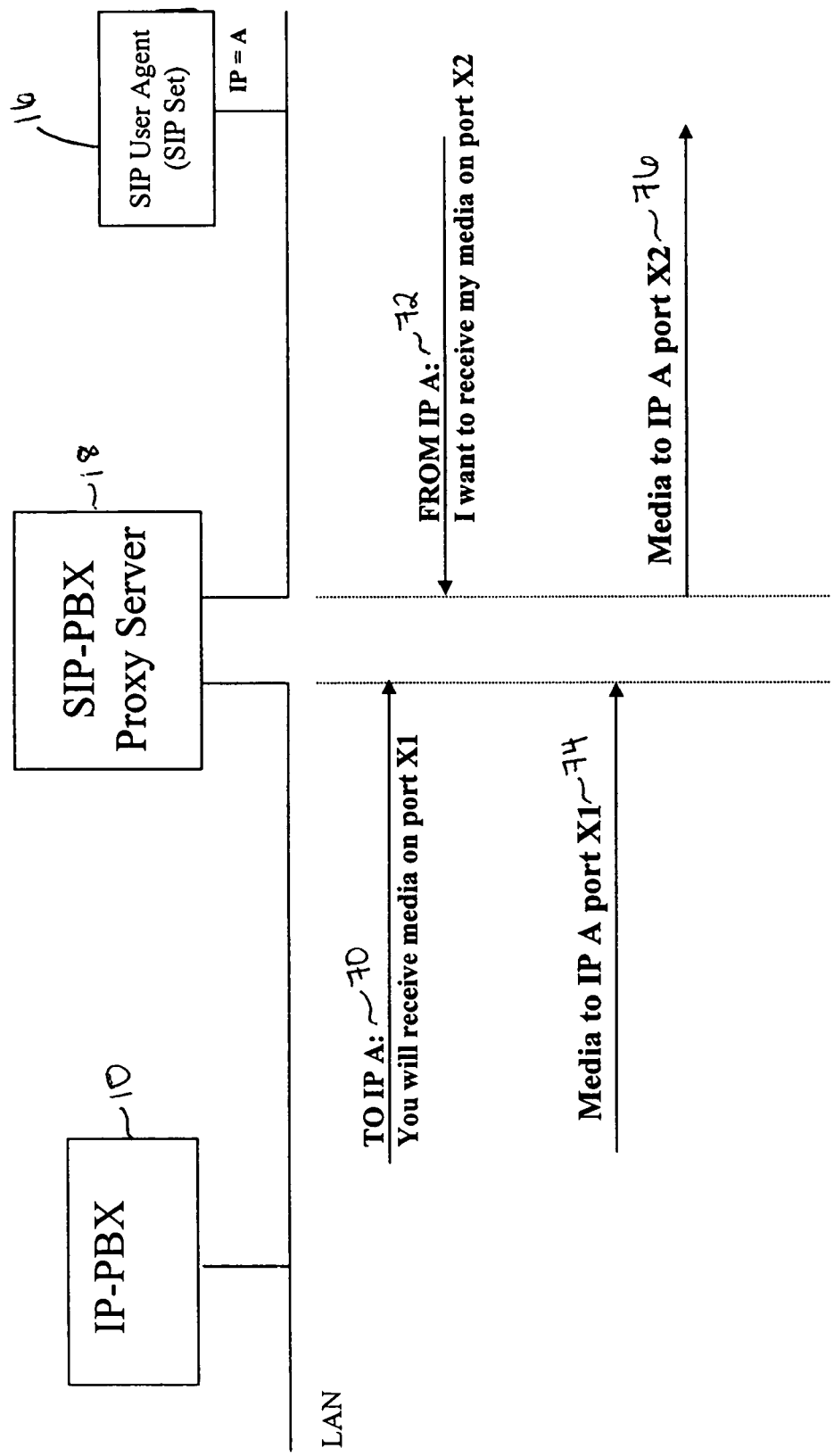
FIG. 2 is a simplified diagram illustrating how a SIP-PBX proxy server reconciles between different voice media setup and handling modes according to one embodiment of the invention.

FIG. 2 is a simplified diagram illustrating how the SIP-PBX proxy server 18 reconciles between the two modes of setup and handling of voice media according to one embodiment of the invention. In step 70, IP-PBX 10 tells SIP set 16 at IP address A (device A) that it will receive media on port X1. In the meantime, device A indicates in step 72 that it wishes to receive media on port X2. The SIP-PBX proxy server 18 intercepts a media packet transmitted in step 74 and destined for IP address A, port X1. The converter 26 within the SIP-PBX proxy server 18 rewrites the packet with a destination port of X2, and transmits the packet to port X2 as indicated in step 76, thus allowing reconciliation to occur. By rewriting the port number for media packets destined for IP address A, the SIP-PBX proxy server allows both the IP-PBX 10 and SIP set 16 to think that the media has been setup in their preferred fashion.

Figure 3:
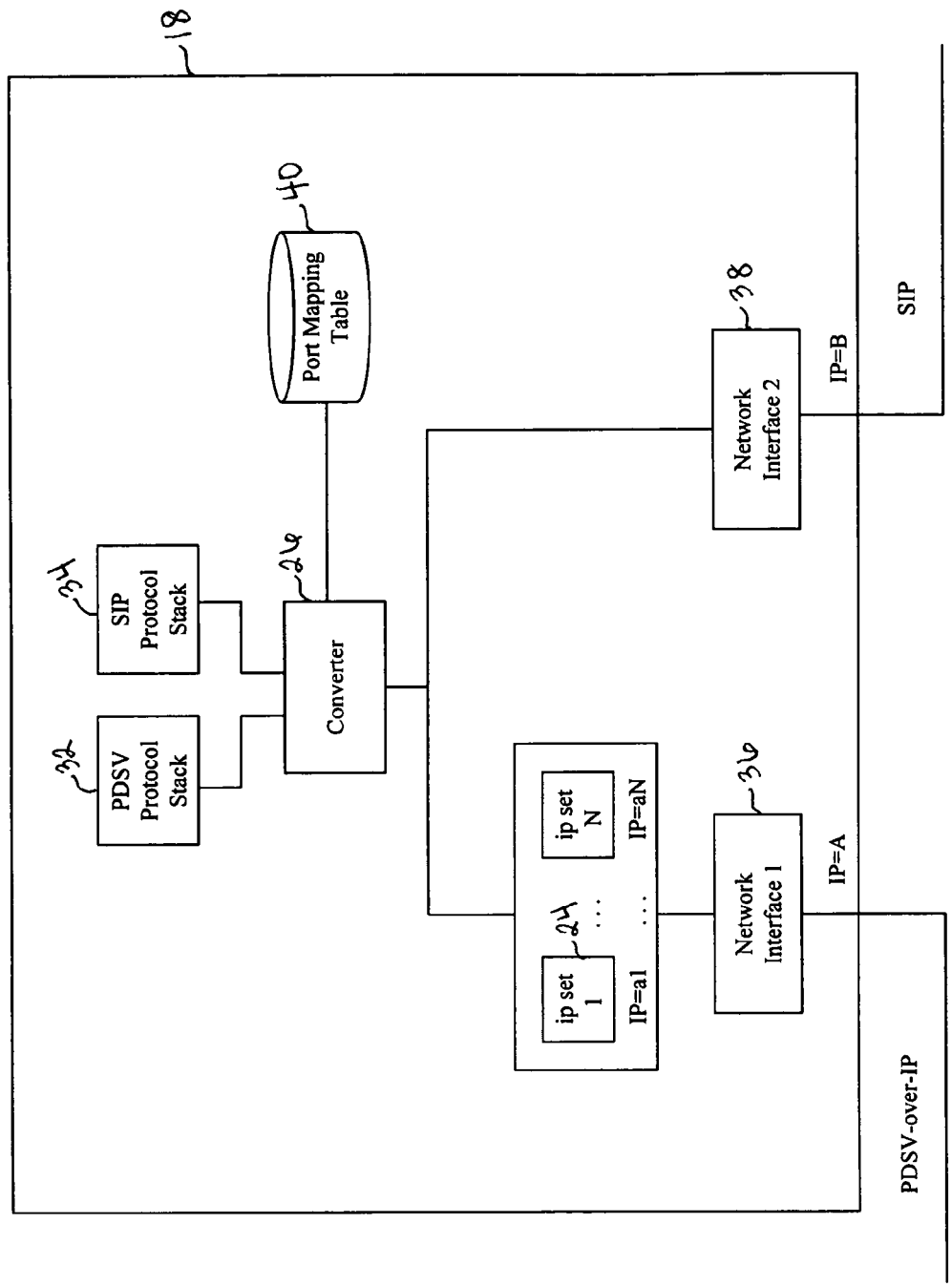
FIG. 3 is a more detailed block diagram of a SIP-PBX proxy server according to one embodiment of the invention.

FIG. 3 is a more detailed block diagram of the SIP-PBX proxy server 18 according to one embodiment of the invention. Each component of the server may be implemented via software using one or more processors. A person of skill in the art should recognize, however, that the components may also be implemented via hardware, firmware (e.g. ASIC), or any combination of software, hardware, and/or firmware.

In the illustrated embodiment, the SIP-PBX proxy server 18 is a two-port IP appliance including a first network interface 36 and a second network interface 38. The network interfaces are also referred to as ports. In alternative embodiments, the SIP-PBX proxy server 18 may be implemented as a one-port IP appliance or multi-port IP appliance that incorporates the SIP-PBX proxy server within a data switch or router.

According to the illustrated embodiment, the first network interface 36 is used to receive and transmit PDSV-over-IP messages from and to the IP-PBX 10. PDSV-over-IP messages received and transmitted through the first network interface 36 contain logical IP and port addresses associated with the logical IP sets 24 maintained by the SIP-PBX proxy server 18.

The second network interface adheres to the SIP protocol, and is used to receive and transmit SIP messages from and to the SIP sets 16.

A converter 26 is coupled to a PDSV protocol stack 32 as well as a SIP protocol stack 34. With the aid of the two protocol stacks, the converter 26 receives SIP messages from the second network interface 38 and translates them into PDSV-over-IP messages for transmitting over the first network interface 36. In the same manner, the converter 26 receives PDSV-over-IP messages from the first network interface 36 and translates them into SIP messages for transmitting over the second network interface 38.

In addition to the translation between PDSV-over-IP and SIP messages, the converter also reconciles between the two modes of handling the setup of media flows. The reconciliation is aided by a port mapping table 40 mapping a SIP set 16 on the network to a logical IP set 24.

Figure 4:
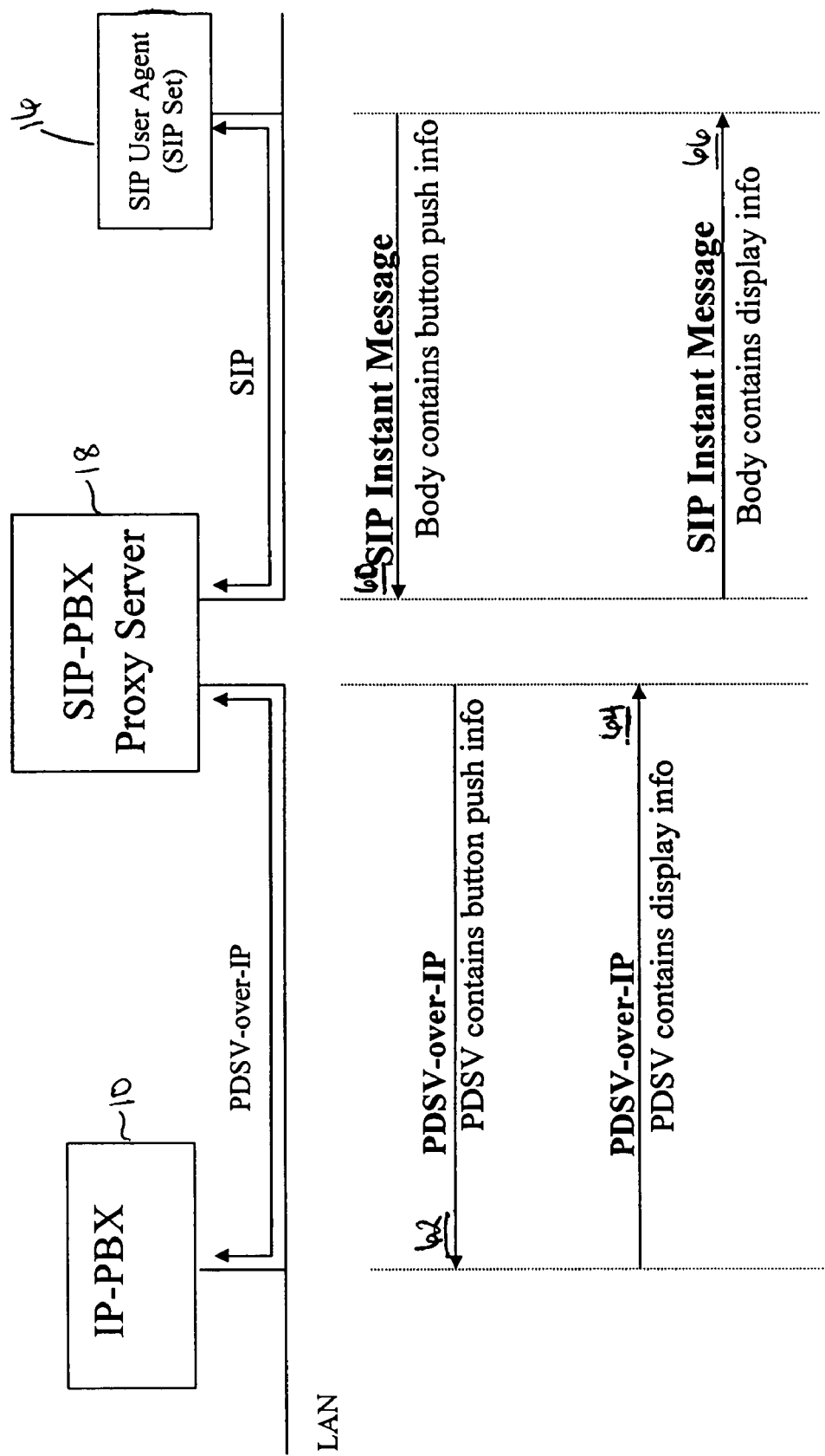
FIG. 4 is a simplified diagram illustrating a translation between PDSV-over-IP messages and SIP messages according to one embodiment of the invention.

FIG. 4 is a simplified diagram illustrating the translation between PDSV-over-IP messages and SIP messages according to one embodiment of the invention. According to the illustrated embodiment, SIP message bodies are used to transport PDSV-over-IP messages, such as, for example, button information and display information. For example, if a user of a particular SIP set 16 presses a button on the set, the set transmits in step 60, a keypress information within the body of a SIP MESSAGE request to the SIP-PBX proxy server 18. The converter 26 within the SIP-PBX proxy server 18 converts the SIP message to the appropriate PDSV-over-IP message and transmits it to the IP-PBX 10 in step 62. The converted PDSV-over-IP message has included as a source address, the address of a logical IP set 24 mapped by the converter 26 to the transmitting SIP set.

Similarly, when the IP-PBX 10 sends a message to a display of the logical IP set mapped to the SIP set in step 64, the converter 26 in the SIP-PBX proxy server 18 translates the PDSV-over-IP message to a SIP MESSAGE, and transmits the SIP MESSAGE to the mapped SIP set in step 66.

Although the exemplary embodiment uses SIP MESSAGE bodies for transporting the messages, other SIP request and response bodies can also be used, such as INVITE, INFO, OK, and the like, as is discussed in U.S. application Ser. No. 10/074,340, filed on Feb. 12, 2002, the content of which is also incorporated herein by reference.

Figure 5A:
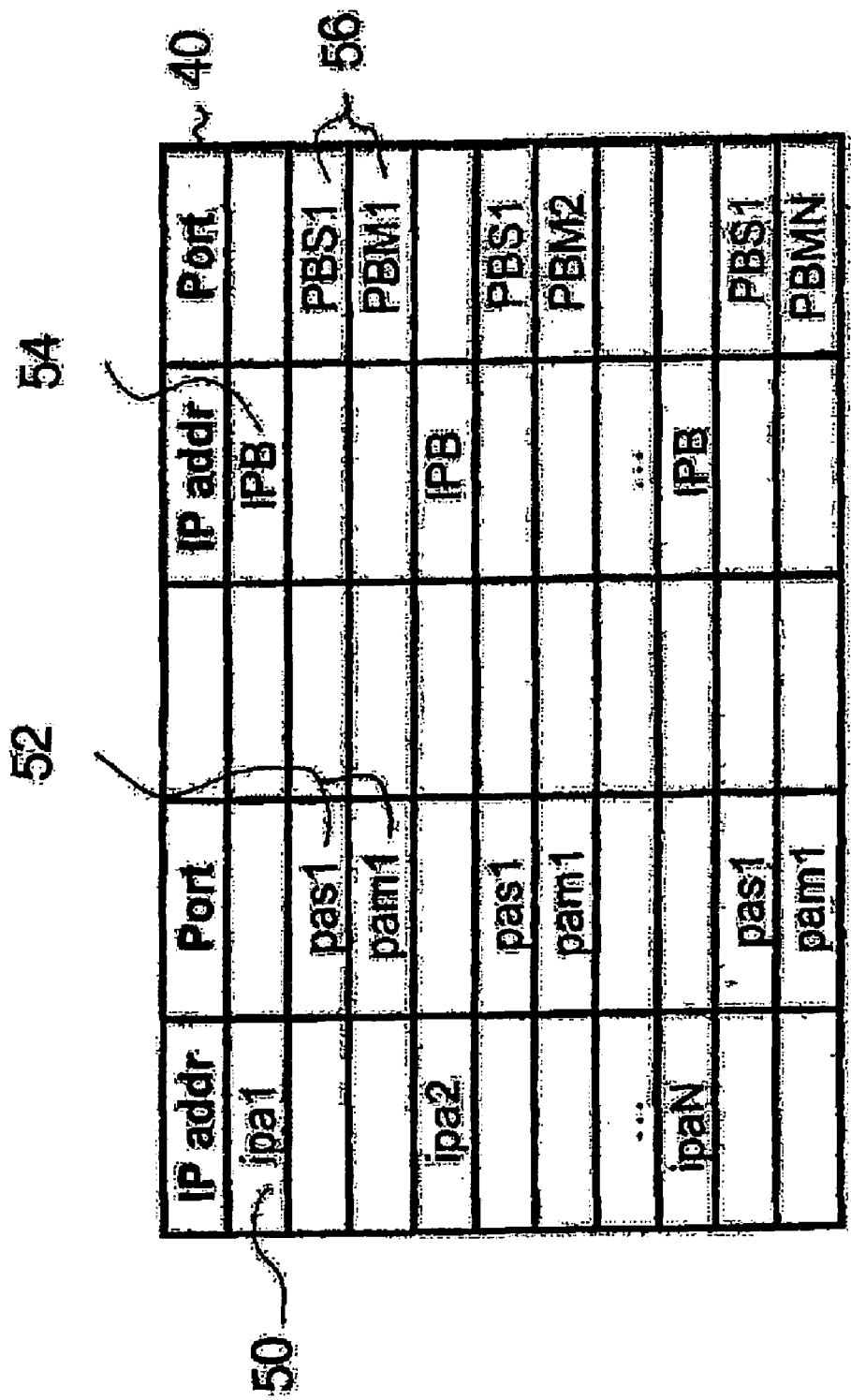
FIG. 5A is an exemplary layout diagram of a port mapping table mapping a SIP set to a logical IP set according to one embodiment of the invention.

FIG. 5A is an exemplary layout diagram of the port mapping table 40 mapping a SIP set 16 on the network to a logical IP set 24 according to one embodiment of the invention. The port mapping table 40 maintains a logical IP address 50 and port 52 for each logical IP set mapped to a SIP set that is accessible via the first network interface 36. The actual IP address for the first network interface 36 is used, according to one embodiment, as a management address for SIP-PBX proxy server 18 configuration and setup.

According to one embodiment of the invention, each logical IP set can receive signaling and media on separate IP UDP or TCP ports 52 referred to as pas1 (signaling port) and pam1 (media port), respectively. For purposes of this example, an assumption is made that the signaling and media port numbers are identical for each of the logical IP sets 24.

The port mapping table 40 also stores for an IP address associated with the second network interface 38, such as for example, IPB, separate signaling and media ports for communicating with the SIP sets 16. According to one embodiment of the invention, a single signaling port, PBS1, that is established on the second network interface 38 is utilized for transmitting and receiving signaling connections with the SIP sets 16. For example, the signaling port PBS1 may be a conventional SIP signaling port, such as, for example, port 5060. In this scenario, the SIP-PBX proxy server is able to distinguish various signaling channels to/from the SIP sets 16 via their remote IP addresses and ports.

Figure 5B:
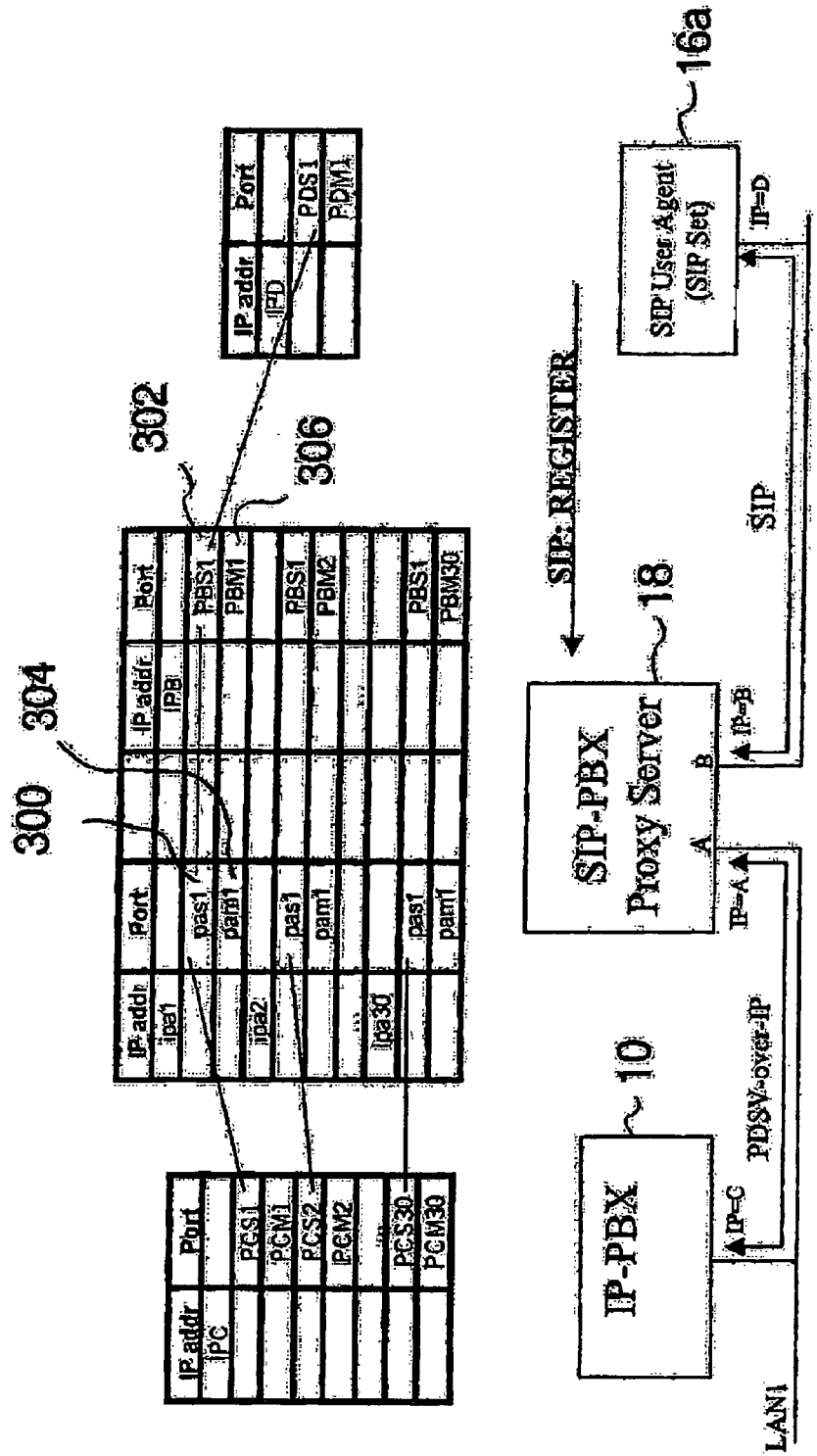
FIG. 5B is a schematic block diagram illustrating a static mapping of a logical IP set to a SIP set according to one embodiment of the invention.

The mapping of logical IP sets 24 to SIP sets 16 may be either static or dynamic. FIG. 5B is a schematic block diagram illustrating a static mapping of a logical IP set to a SIP set according to one embodiment of the invention. In the illustrated embodiment, the mapping of a SIP set at IP address D (referred to as SIP set D) 16a is setup when it registers with the SIP-PBX proxy server 18 via a SIP REGISTER message. The mapping persists for the duration of the registration session. According to one embodiment of the invention, the SIP-PBX proxy server 18 also reserves the mapping of associated media channels even though media may not be flowing through them. For example, once a SIP set D 16a has registered with the SIP-PBX proxy server 18, a mapping of a signaling channel having IP address ipa1 and signaling port pas1 (hereinafter referred to as ipa1:pas1) 300, and IP address IPB and signaling port PBS1 (hereinafter referred to as IPB: PBS1) 302 is established, and a mapping of media channel having IP address ipa1 and media port pam1 (hereinafter referred to as ipa1:pam1) 304, and IP address IPB and media channel PBM1 (hereinafter referred to as IPB:PBM1) 306 is also reserved. Once a call involving SIP set D 16a terminates, the SIP-PBX proxy server 18 retains the mapping of ipa1: pam1 304 to IPB:PBM1 306 for the duration of the registration period.

If SIP set D 16a re-registers before the registration period expires, the mapping of signaling and media channels is simply refreshed. However, if the registration expires, in one embodiment of the invention, the signaling channel ipa1:pas1 300 and associated media channel ipa1:pam1 304 are returned to an internal pool of available channels that can be mapped to future registrants. In another embodiment, the channel continues to be reserved for a particular user, assuring that this user always has an available channel upon registration.

Figure 5C:
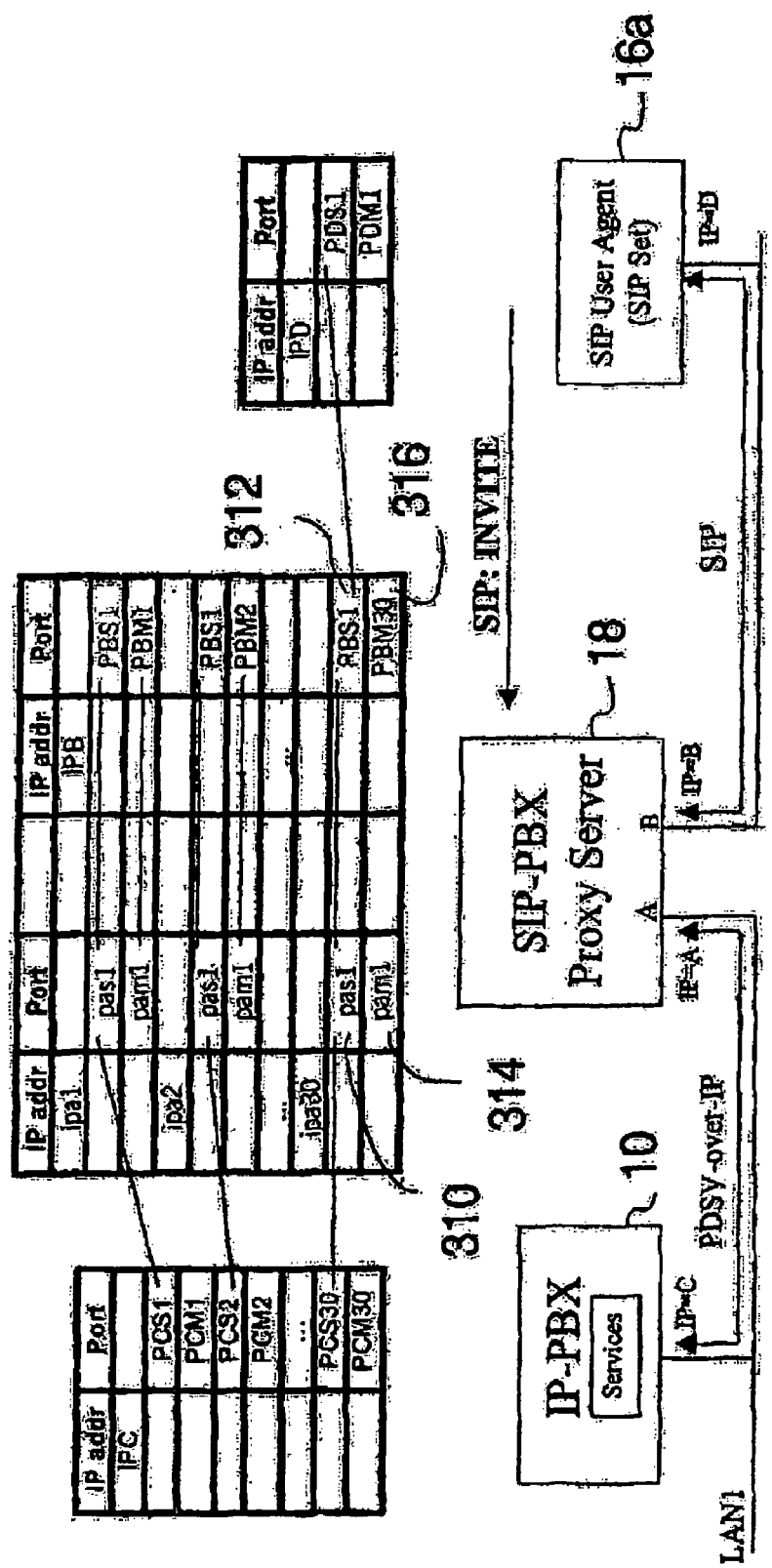
FIG. 5C is a schematic block diagram illustrating a dynamic mapping of a logical IP set to a SIP set according to one embodiment of the invention.

FIG. 5C is a schematic block diagram illustrating a dynamic mapping of a logical IP set 24 to a SIP set 16 according to one embodiment of the invention. In the dynamic mapping method, a single logical IP set 24 may be shared among multiple SIP sets 16. Furthermore, the mapping is not setup until a voice session to or from a SIP set is established.

In the illustrated embodiment, SIP Set D 16a issues an INVITE message to the SIP-PBX proxy server. Because in this exemplary embodiment all other channels are already in session, the SIP-PBX proxy server 18 finds a next available logical IP set, ipa30, and assigns it to SIP set D for the duration of the session. The SIP-PBX proxy server 18 thus dynamically maps ipa30:pas1 310 and IPB:PBS1 312 for signaling and reserves ipa30:pam1 314 and IPB:PBM30 316 for media for the duration of the voice session. The mapping persists for the duration of the voice session. When the voice session completes, the logical IP set's signaling and media channels are returned to a pool of available channels according to one embodiment of the invention. The dynamic mapping method thus allows a smaller number of logical IP channels to be shared, that is, trunked, among a larger number is SIP sets 16.

Figure 6:
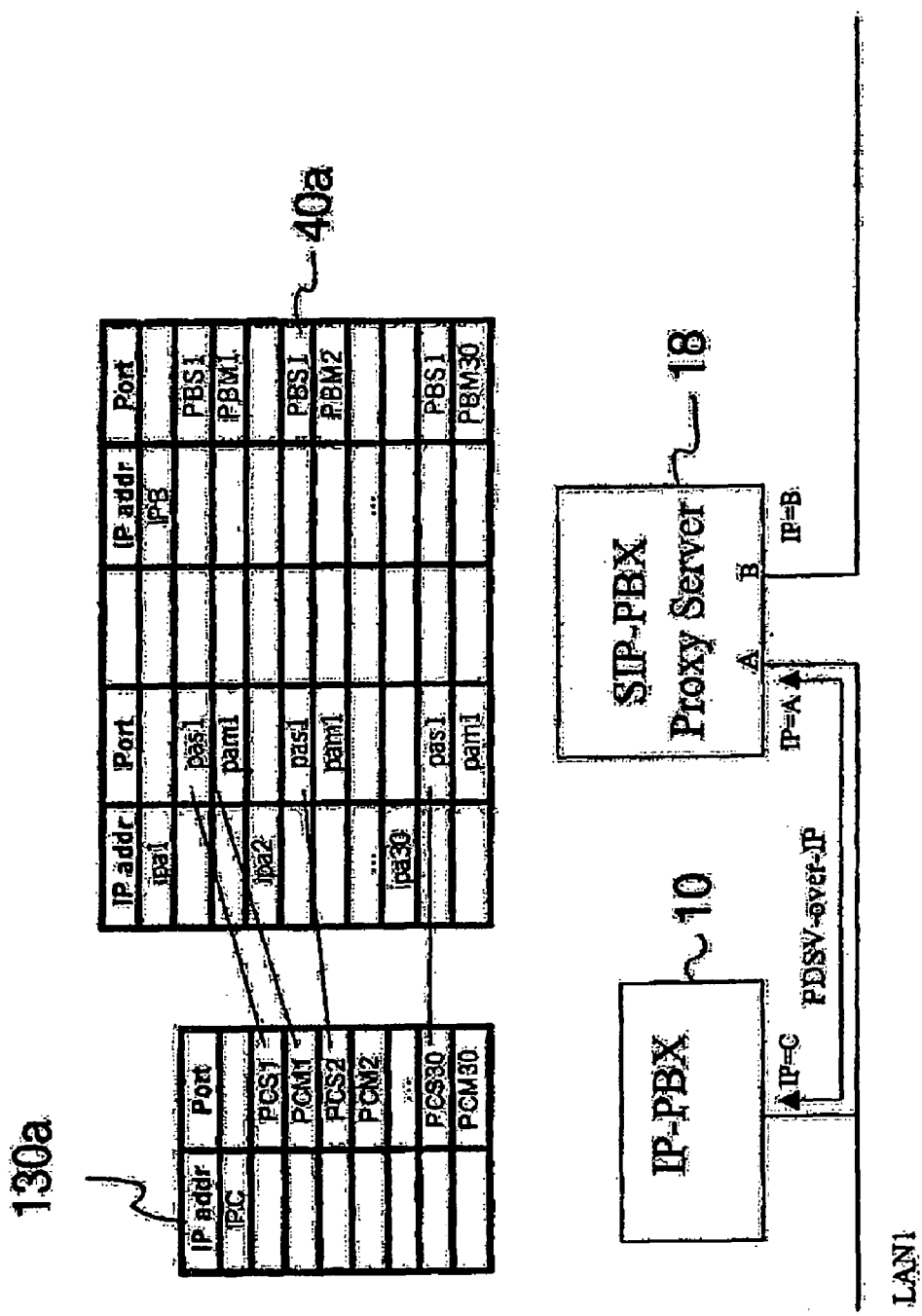
FIG. 6 is a schematic block diagram illustrating the connections established between an IP-PBX and logical IP sets maintained by a SIP-PBX proxy server according to one embodiment of the invention.

FIG. 6 is a schematic block diagram illustrating the connections established between the IP-PBX 10 and the logical IP sets 24 maintained by the SIP-PBX proxy server 18 according to one embodiment of the invention. For purposes of this example, an assumption is made that signals are exchanged between the IP-PBX 10 and logical IP set ipa1. An assumption is also made that the IP-PBX 10 is located at address IPC and uses signaling port PCS1, and logical IP set ipa1 uses signaling port pas1, as is illustrated in tables 130a and 40a. Exchange of two-way signaling information on these ports is achieved, according to the illustrated example, by transmitting a signal from the IP-PBX 10 to logical IP set ipa1 with a packet header indicating a source with address IPC and port PCS1 (IPC:PCS1), and a destination with address ipa1 and port pas1 (ipa1:pas1), and transmitting a signal from the logical IP set ipa1 to the IP-PBX 10 with a packet header indicating a source with address ipa1 and port pas1 (ipa1:pas1), and a destination with address IPC and port PCS1 (IPC:PCS1).

Hereinafter, the convention for indicating a header with source <scaddr:scport> and destination <destaddr:destport> will be <scaddr:scport/destaddr:destport>.

Signaling from the IP-PBX 10 to logical IP set ipa2 has a packet header of IPC:PCS2/ipa2:pas1, and signaling from the logical IP set ipa2 to the IP-PBX has a packet header of ipa2:pas1/IPC:PCS2.

In addition to signaling, assume that the IP-PBX 10 in the illustrated embodiment has also setup a two-media channel between itself and logical IP set ipa1. In the illustrated example, media packets flow from the IP-PBX 10 to logical IP set ipa1 with a packet header of IPC:PCM1/ipa1:pam1, and media packets flow from logical IP set ipa1 to the IP-PBX with a packet header of ipa1:pam1/IPC:PCM1.

In the embodiment illustrated in FIG. 6, port symmetry is used where signaling is both received and transmitted by ipa1 on port pas1, and media is both received and transmitted by ipa1 on port pam1.

Figure 7:
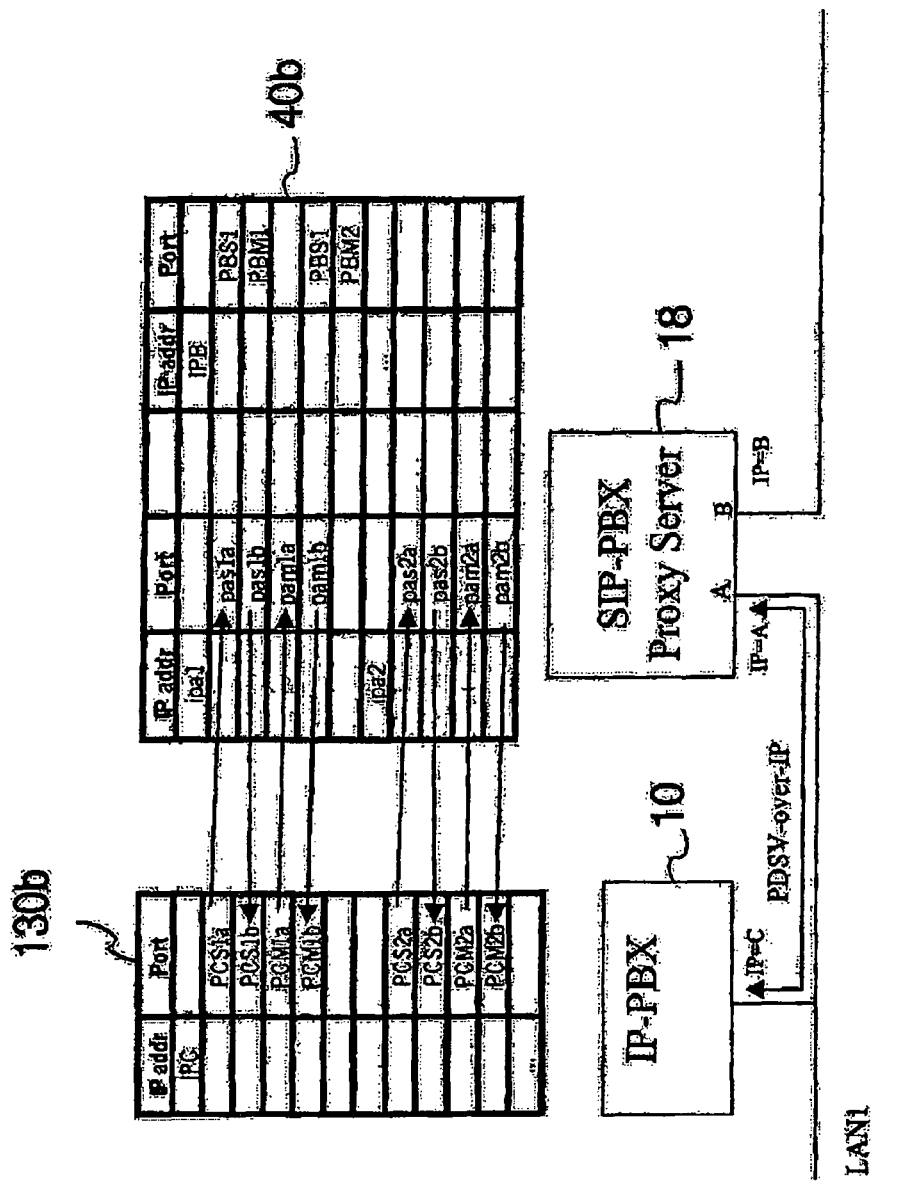
FIG. 7 is a schematic block diagram illustrating the connections established between an IP-PBX and logical IP sets maintained by a SIP-PBX proxy server according to another embodiment of the invention.

FIG. 7 is a schematic block diagram illustrating the connections established between the IP-PBX 10 and the logical IP sets 24 maintained by the SIP-PBX proxy server 18 according to another embodiment of the invention. According to the embodiment illustrated in FIG. 7, the two-way signaling or media exchange uses non-symmetric ports. In this illustrated embodiment, logical IP set ipa1 receives signaling on port pas1a, while it transmits media on a different port pas1b as is illustrated in tables 130b and 40b. However, to simplify the description of operation, and without loss of generality, an assumption will henceforth be made that the ports are symmetric.

Figure 8:
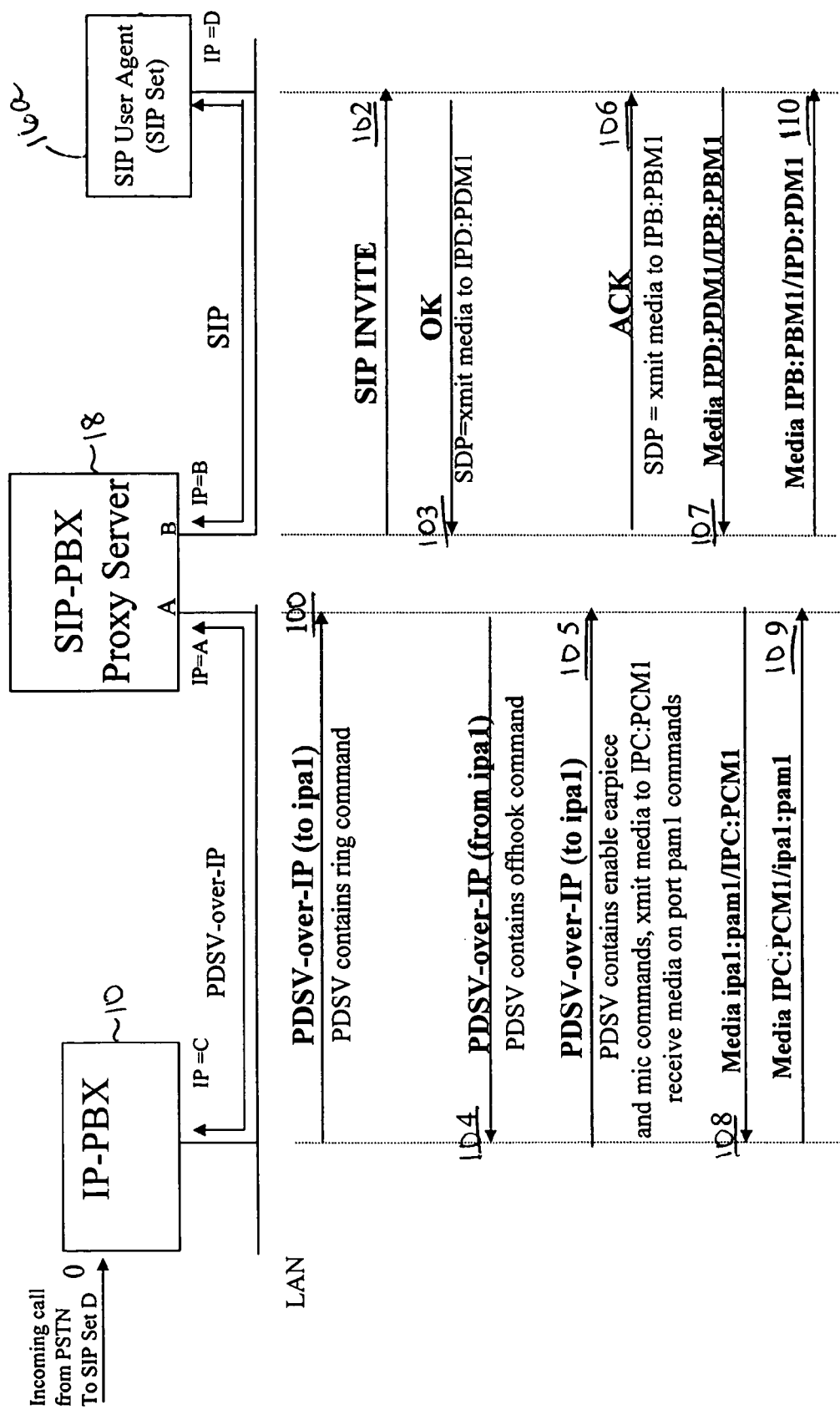
FIG. 8 is a signaling diagram for handling an incoming call from a PSTN to a SIP set according to one embodiment of the invention.

FIG. 8 is a signaling diagram for handling an incoming call from the PSTN to a SIP set located at IP address D (referred to as SIP set D) 16a according to one embodiment of the invention. Assume for purposes of this illustration that logical IP set at address ipa1 (referred simply as ipa1) is mapped to SIP set D 16a. In step 100, the IP-PBX 10 issues a PDSV ring command to ipa1, which is then converted to a SIP INVITE message and sent to SIP set D 16a in step 102. In step 103, SIP set D 16a offhooks and a SIP OK message is sent back to the SIP-PBX proxy server 18. The OK message includes a media address on which SIP set D 16a wishes to receive its media.

In step 104, the SIP-PBX proxy server 18 issues a PDSV offhook signal in response to the OK message. In step 105, the IP-PBX 10 instructs ipa1 where it should send its media (IPC:PCM1), and where it should receive its media (pam1). The IP-PBX 10 also transmits an enable earpiece/mic command which is recognized by the SIP-PBX proxy server 18 and converted to a SIP ACK message. The ACK message also contains a session description protocol (SDP) body containing the media address at which the SIP-PBX proxy server 18 wishes to receive media from SIP set D 16a. The ACK message with the SDP body is sent to SIP set D in step 107.

The media from SIP set D 16a flows through the SIP-PBX proxy server 18 to the IP-PBX 10, and the media from the IP-PBX 10 flows through the SIP-PBX proxy server to SIP set D. The media packet headers are re-written as shown in steps 107, 108, 109, and 110 to reconcile for the difference in media setup data. The IP-PBX 10 thinks it has setup the media, and Sip set D 16a thinks it has negotiated peer-to-peer media flow.

Figure 9:
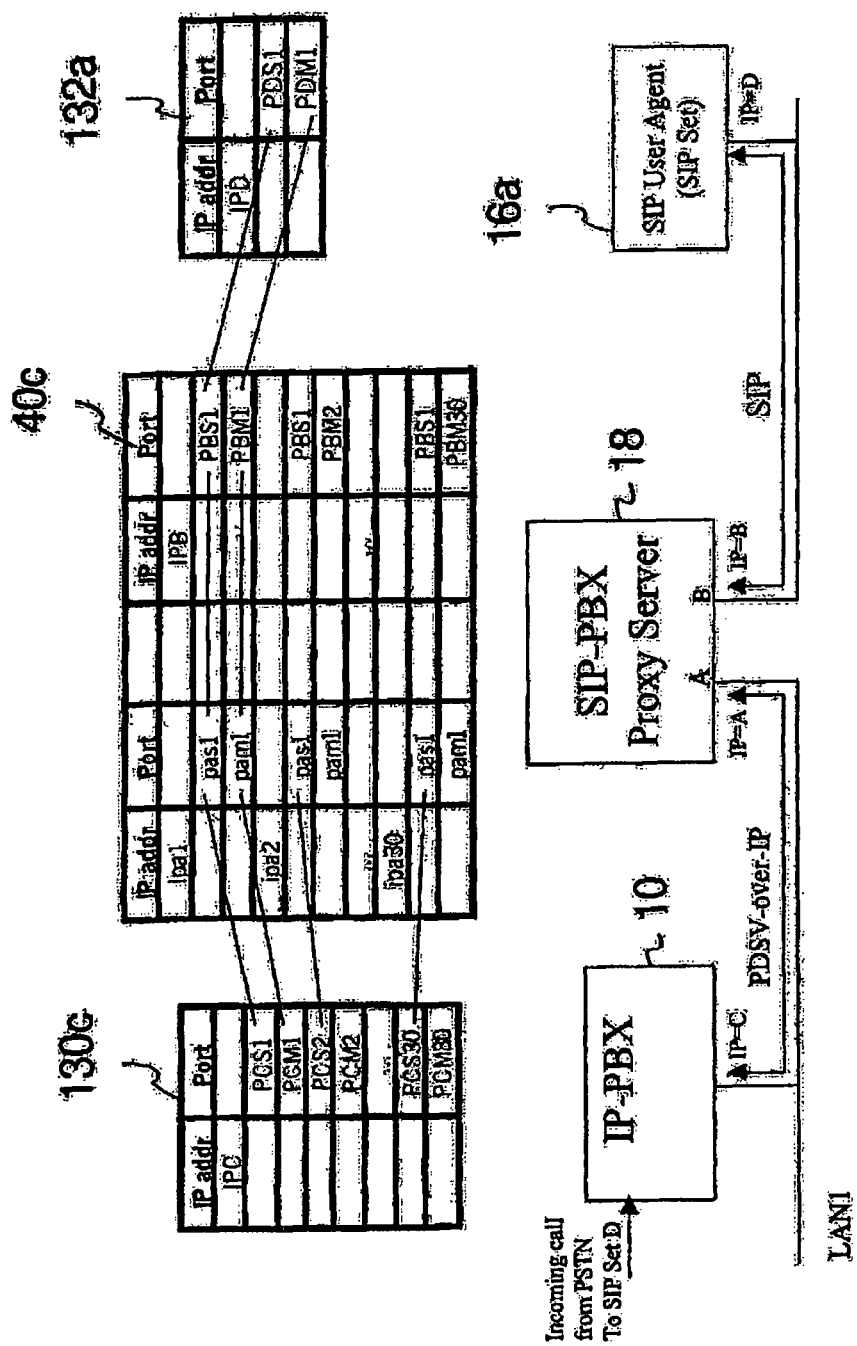
FIG. 9 is a schematic block diagram illustrating the connections made based on the exchange of signals in FIG. 8 according to one embodiment of the invention.

FIG. 9 is a schematic block diagram illustrating the connections made based on the exchange of signals in FIG. 8 according to one embodiment of the invention. According to the illustrated embodiment, the IP-PBX 10 thinks it is exchanging signaling and media with ipa1 on ipa1:pas1 and ipa1:pam1, respectively, while SIP set D 16a thinks it is exchanging signaling and media with the SIP-PBX proxy server 18 on IPB:PBS1 and IPB:PBM1, respectively. In fact, the SIP-PBX proxy server 18 has made a logical internal connection, or mapping, between ipa1:pas1 and IPB:PBS1 for the signaling ports, and between ipa1:pam1 and IPB:PBM1 for the media ports, as is illustrated via tables 130c, 40c, and 132a. For example, an RTP packet that arrives on port A (the first network interface 36) with source IPC:PCM1 and destination ipa1:pam1 is copied to port B (the second network interface 38) and re-labeled with source IPB:PBM1 and destination IPD:PDM1. Similarly, an RTP packet that arrives on port B with source IPD:PDM1 and destination IPB:PBM1 is copied to port A and re-labeled with source ipa1:pam1 and destination IPC:PCM1. In this manner, the SIP-PBX proxy server 18 has connected the incoming PSTN call to SIP set D 16a, while fully reconciling the master-slave and peer-to-peer expectations of the IP-PBX and SIP set.

Figure 10:
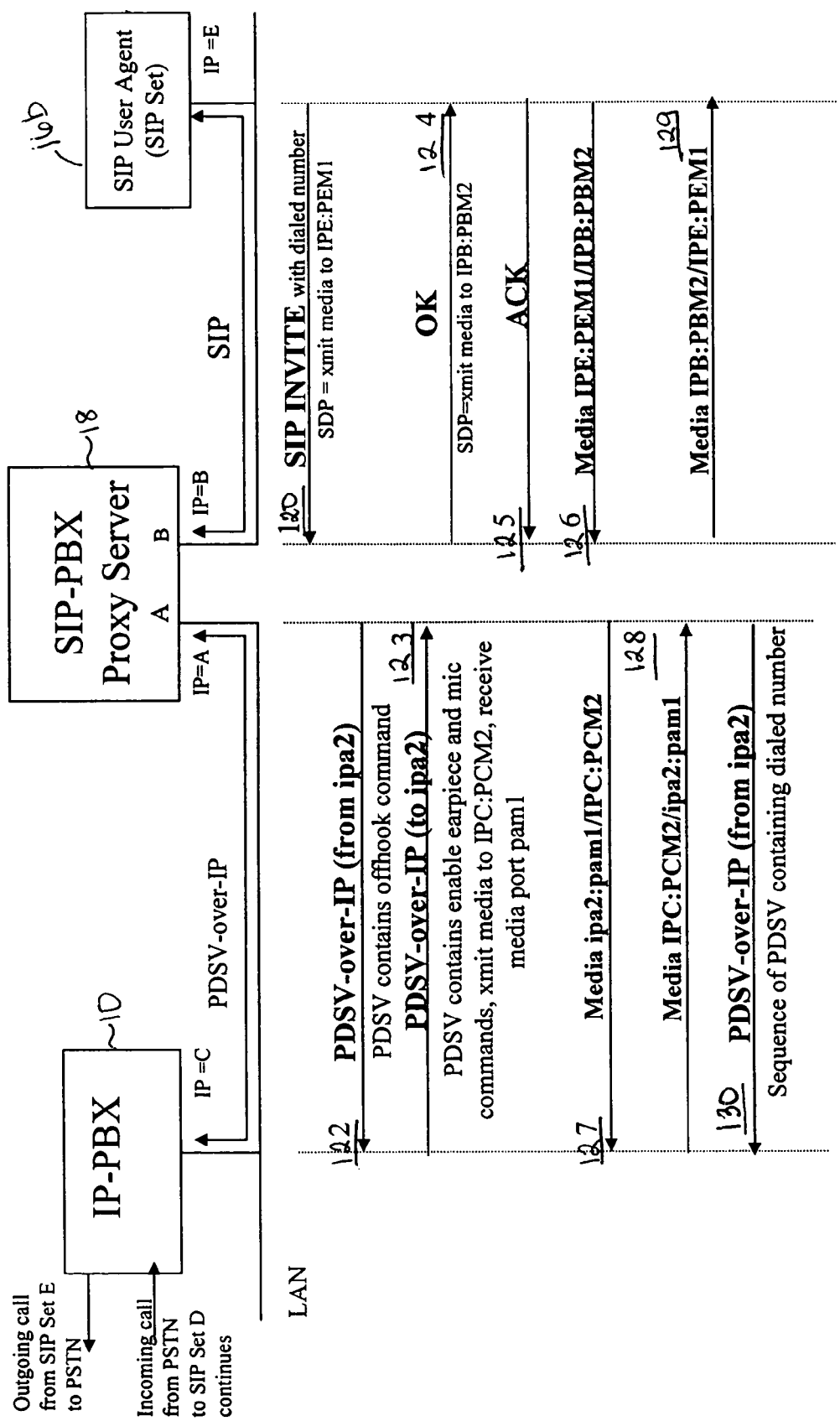
FIG. 10 is a signaling diagram for handling an outgoing call to the PSTN from a SIP set according to one embodiment of the invention.

FIG. 10 is a signaling diagram for handling an outgoing call to the PSTN from SIP set E 16b while an incoming call to SIP set D 16a remains in session, according to one embodiment of the invention. According to this example, a dialed-number of a callee is included in a "To:" header of a SIP INVITE message transmitted by SIP set E 16b in step 120. The transmitted SIP INVITE message identifies a media port, PEM1, in which SIP set E wishes to receive its media. The SIP-PBX proxy server 18 receives the SIP INVITE message via the second network interface 38, maps SIP set E 16b to a logical IP set 24 (ipa2 in this example), converts the SIP INVITE message to an appropriate PDSV-over-IP message, and transmits the PDSV-over-IP message to the IP-PBX with source address ipa2, in step 122.

In step 123, the IP-PBX 10 transmits an enable earpiece and mic command as a PDSV-over-IP message addressed to ipa2. The IP-PBX 10 further indicates in its message where ipa2 should send its media (IPC:PCM2) and where it should receive its media (pam1). The SIP-PBX proxy server 18 recognizes the earpiece/mic command, maps pam1 to the media port associated with SIP set E (PBM2), and transmits in step 124, a SIP OK message with the mapped media port indicating where SIP set E 16b should send its media. SIP set E responds with a SIP ACK message in step 135. At this point, SIP set E 16b has established a two-media connection with the IP-PBX 10. Media transfer with associated packet address re-labeling then occurs as indicated in steps 126-129.

In step 130, the called number is converted to a series of PDSV button pushes so that the IP-PBX can subsequently connect to the callee.

Figure 11:
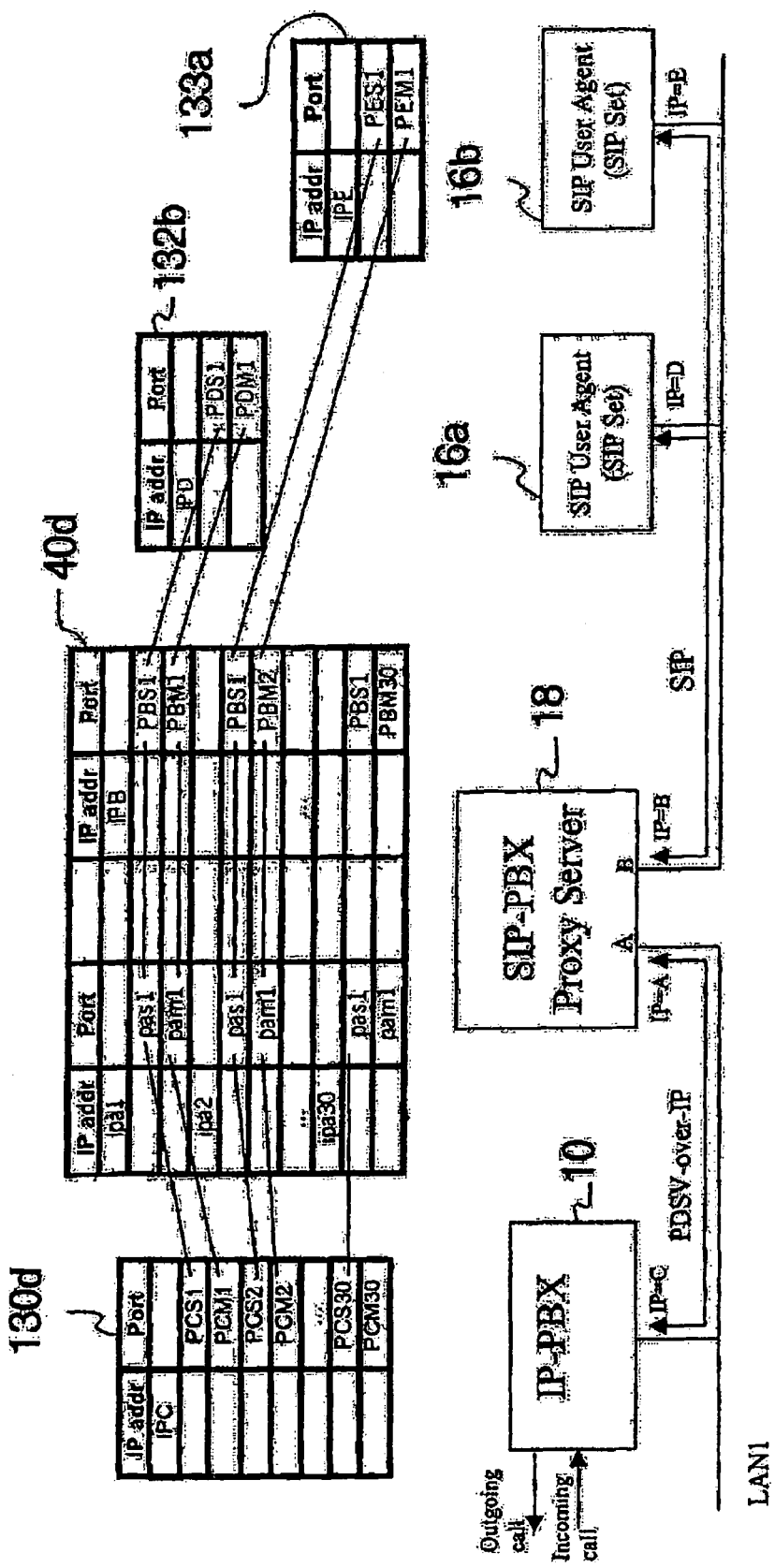
FIG. 11 is a schematic block diagram illustrating the connections made based on the exchange of signals in FIG. 10 according to one embodiment of the invention.

FIG. 11 is a schematic block diagram illustrating the connections made based on the exchange of signals in FIG. 10 according to one embodiment of the invention. Two-way media continues to flow to/from SIP set D 16a while two-way media also flows to/from SIP set E 16b. Both SIP sets are in conversation with the PSTN via the IP-PBX 10. The SIP-PBX proxy server 18 has made internal connections between ports as illustrated via tables 130d, 40d, 132b, and 133a.

Figure 12:
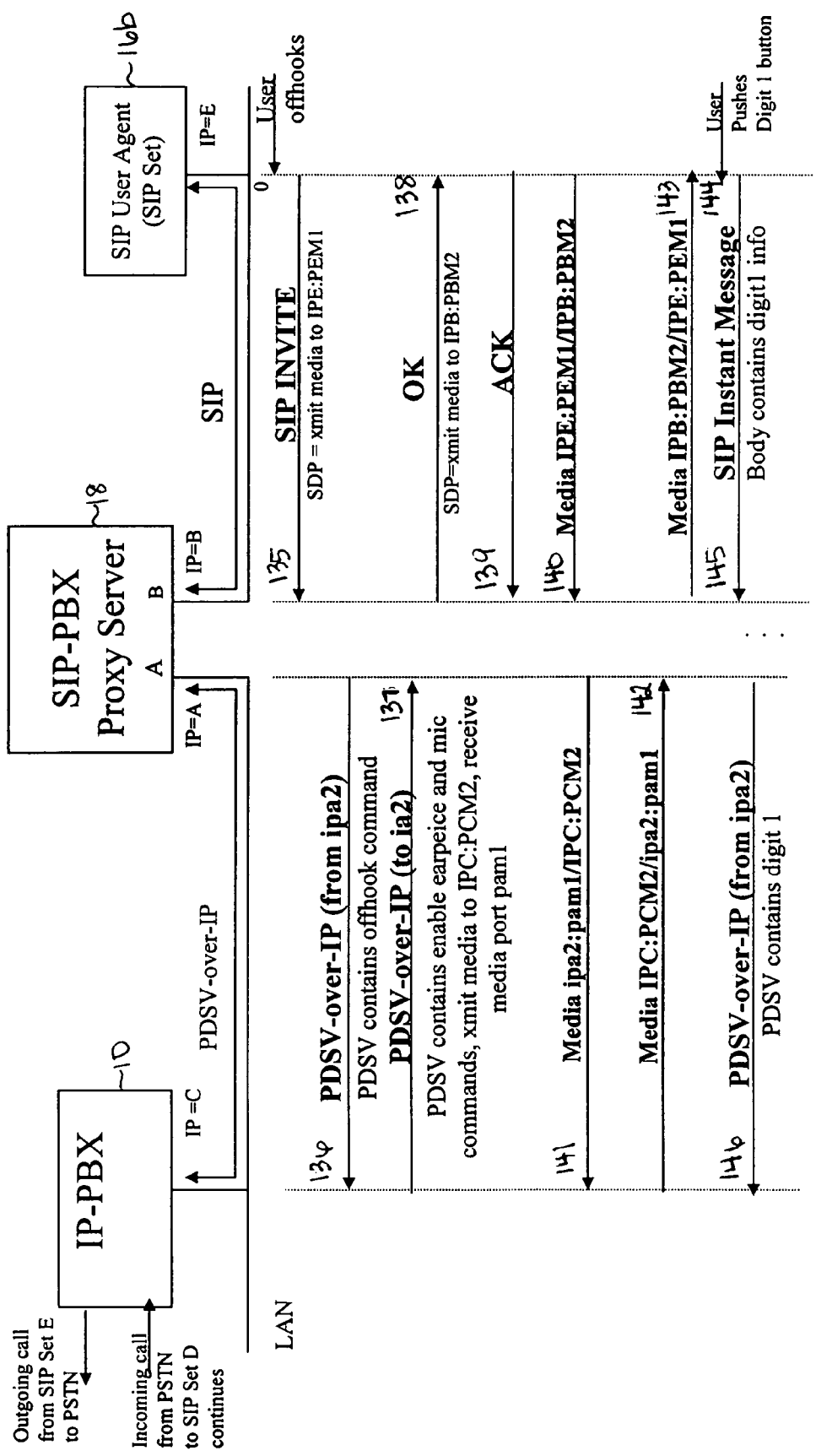
FIG. 12 is a signaling diagram for handling an outgoing call to the PSTN from a SIP set according to another embodiment of the invention.

FIG. 12 is a signaling diagram for handling an outgoing call to the PSTN from SIP set E 16b while an incoming call to SIP set D remains in session according to another embodiment of the invention. Signaling in steps 135-143 is similar to the signaling in steps 120-129 of FIG. 10, except that the SIP INVITE message transmitted in step 135 does not include the dialed number. Instead, individual keypresses on SIP set E 16b in step 144 causes SIP set E to transmit an individual SIP Instant message with each keypress, causing the SIP-PBX proxy server 18 to generate a corresponding PDSV keypress as is illustrated in steps 140 and 142.

Figure 13:
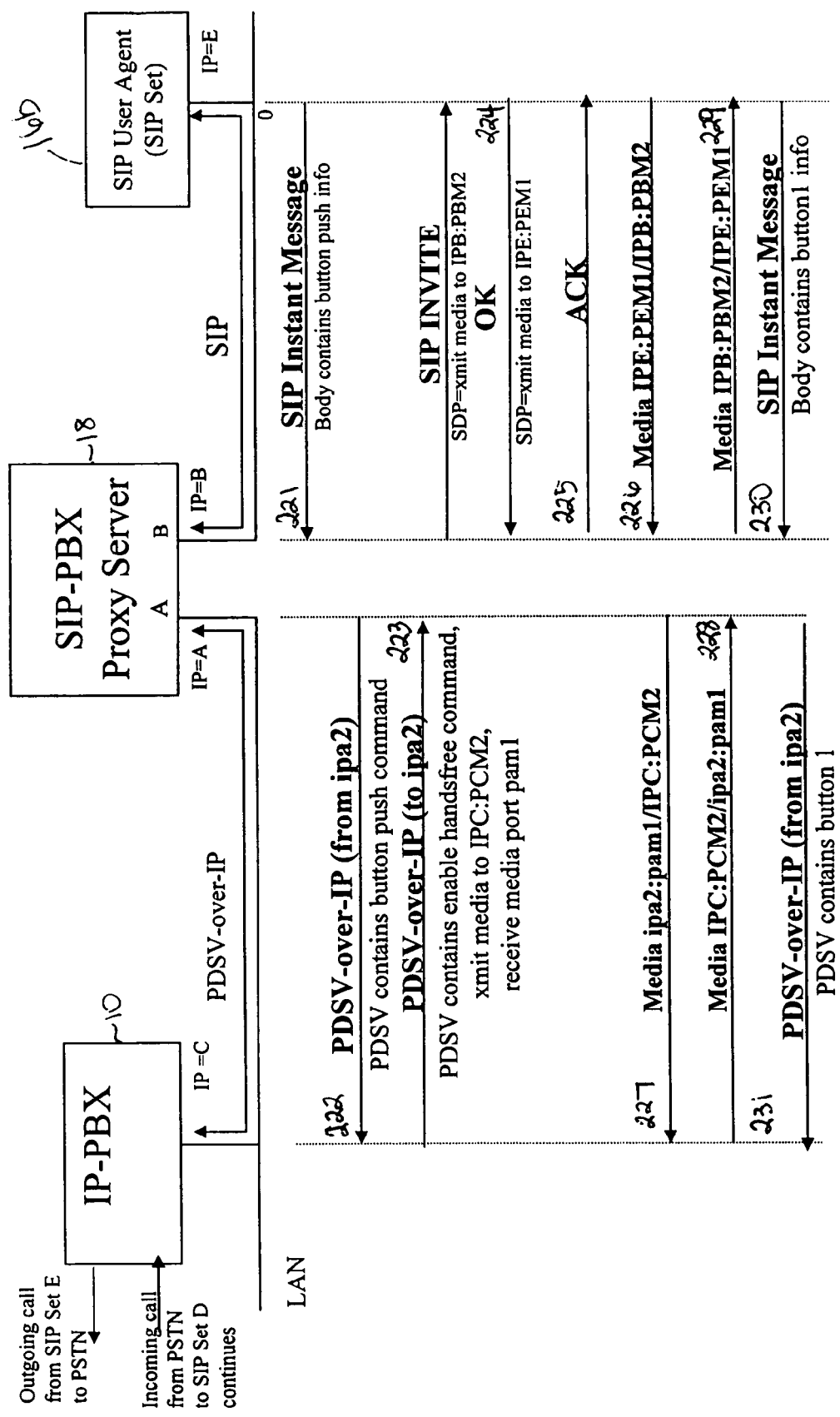
FIG. 13 is a signaling diagram for handling an outgoing call to the PSTN in a hands-free speakerphone mode according to one embodiment of the invention.

FIG. 13 is a signaling diagram for handling an outgoing call to the PSTN in a hands-free speakerphone mode, while SIP Set D 16a continues to remain in conversation, according to one embodiment of the invention. The signaling exchanged among the IP-PBX 10, SIP-PBX proxy server 18, and SIP set E 16b are illustrated in steps 121-231.

Figure 14:
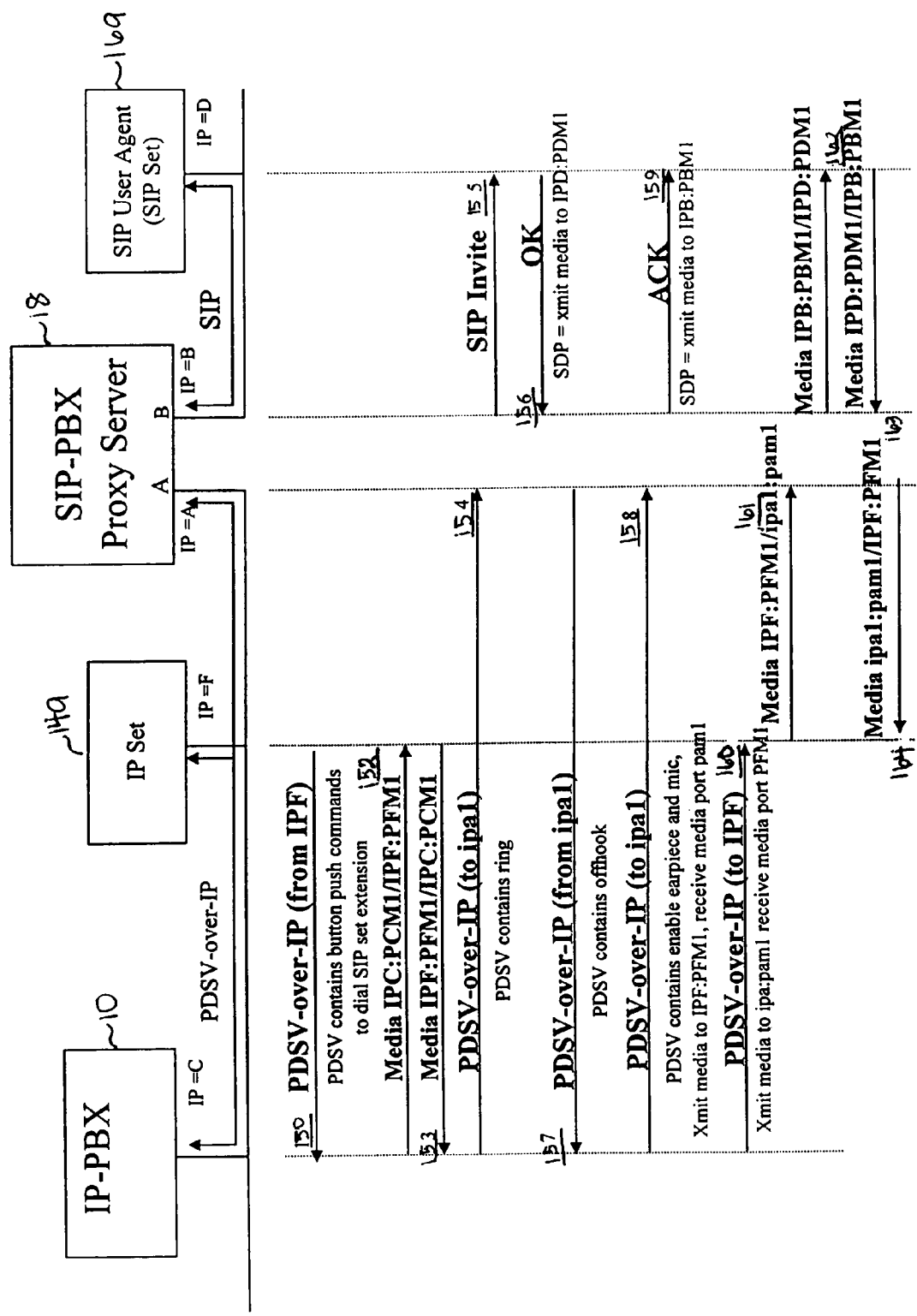
FIG. 14 is a signaling diagram for handling a call from an IP set to a SIP set according to one embodiment of the invention.

FIG. 14 is a signaling diagram for handling a call from IP set F 14a to SIP set D 16a according to one embodiment of the invention. The signaling travels to/from SIP set D 16a from/to the IP-PBX 10 through the SIP-PBX proxy server 18. Media travels to/from SIP set D 16a from/to the IP set F 14a via the SIP-PBX proxy server 18 which reconciles the media by rewriting packet addresses. According to the illustrated embodiment, media does not flow via the IP-PBX 10.

In this regard, IP set F 14a offhooks and a media connection to/from the IP-PBX 10 is established. In step 150, IP set F 14a dials the extension for SIP set D 16a using key presses. Media is exchanged between the IP-PBX 10 and IP set F 14a via their respective ports PCM1 and PFM1, respectively, as indicated in steps 152-153.

The IP-PBX 10 receives the keypresses, and in step 154, transmits a PDSV-over-IP ring command for logical IP set ipa1 mapped to SIP set D. The SIP-PBX proxy server 18 converts the ring command to a SIP INVITE message, and transmits the SIP INVITE message to SIP set D 16a in step 155.

When SIP set D 14a offhooks, it transmits in step 156, a SIP OK message to the SIP-PBX proxy server 18 with an SDP of IPD:PDM1, indicating the address and port on which IP set D prefers to receive its media. The SIP-PBX proxy server 18 receives the OK message and in step 157, issues a corresponding offhook PDSV command back to the IP-PBX 10. The SIP-PBX server 18 stores the address IPD:PDM1 so that it can eventually send media to this address.

Having received the offhook signal in step 157, the IP-PBX 10 sends an enable earpiece and mic command in step 158 to the logical IP set ipa1. The command transmitted in step 158 also includes an instruction to ipa1 to send its media to IPF:PFM1 corresponding to IP set F, and an instruction to receive its media on port pam1. The SIP-PBX Proxy Server receives these parameters and stores them to allow media processing based on this information. An ACK message is then transmitted to SIP set D 16a in step 159.

In step 160, the IP-PBX 10 sends a command to IP set F 14a instructing it to send its media to the logical IP set ipa1 at ipa1:pam1, and to receive its media on port PFM1. In this manner, the IP-PBX 10 thinks that it has setup a call between IP set F 14a and logical IP set ipa1, and that these two sets are exchanging media directly. However, since ipa1 is, according to one embodiment of the invention, an internal logical set in the SIP-PBX proxy server 18 mapped to SIP set D, media is processed by rewriting the packet headers. Thus, media packets transmitted in step 161 by IP set F 14a having a header of IPF:PFM1/ipa1:pam1 are rewritten and re-transmitted in step 162 as coming from the SIP-PBX proxy server 18 and destined for SIP set D 16a with a header of IPB:PBM1/IPD: PDM1. Similarly packets coming from SIP set D 16a in step 163 with a header of IPD:PDM1/IPB:PBM1 are rewritten by the SIP-PBX proxy server 18 and transmitted in step 164 as packets with a header of ipa1:pam1/IPF:PFM1. The SIP-PBX proxy server 18 has thus processed the media so that the master-slave mode of the IP-PBX 10 and the peer-to-peer mode of SIP set D 16a are fully reconciled.

Figure 15:
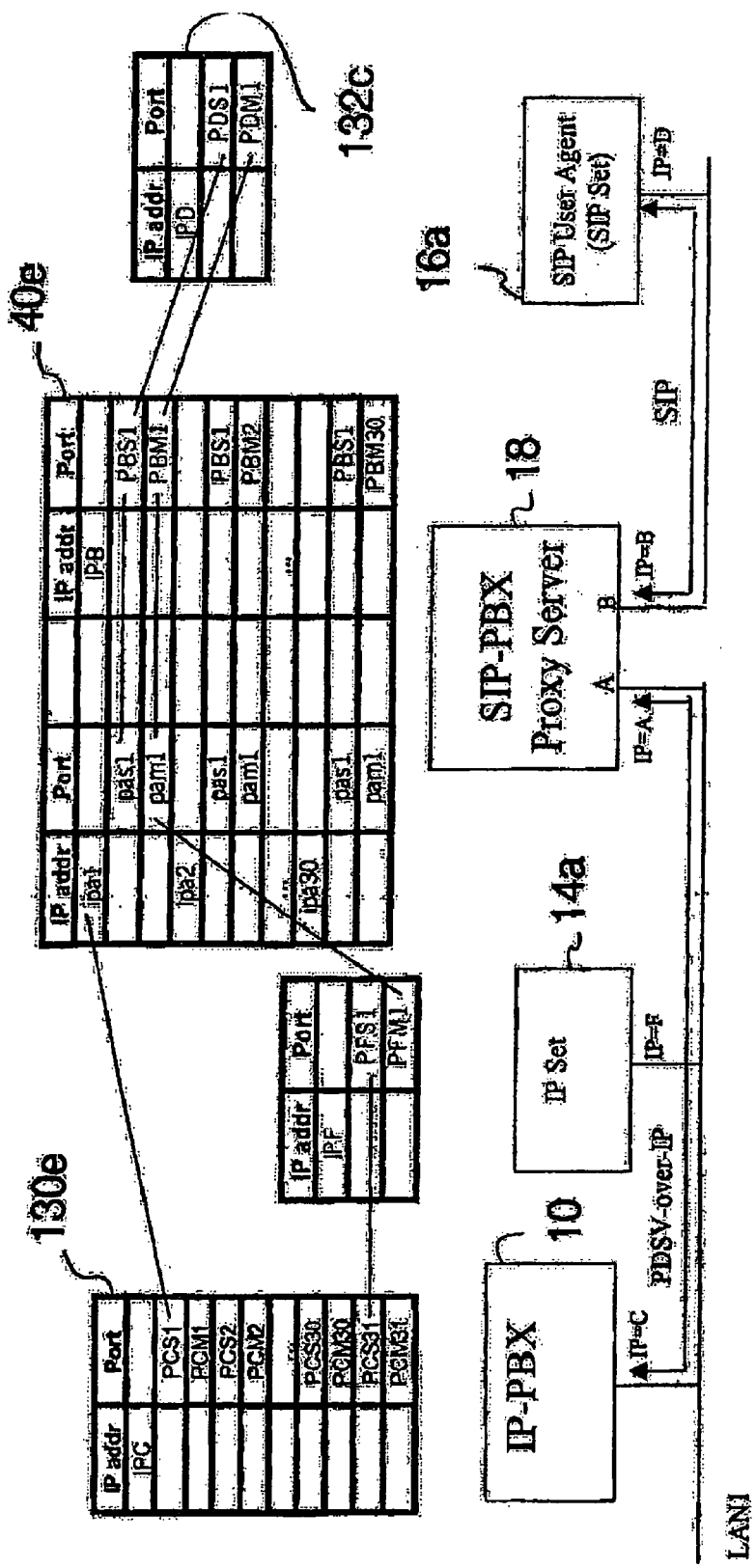
FIG. 15 is a schematic block diagram illustrating the connections made based on the exchange of signals in FIG. 14 according to one embodiment of the invention.

FIG. 15 is a schematic block diagram illustrating the connections made based on the exchange of signals in FIG. 14 according to one embodiment of the invention. According to the illustrated embodiment, the IP-PBX 10 has setup two-way media flow between IP set F 14a and logical set ipa1, as depicted via tables 130e and 40e. However, the SIP-PBX proxy server processes the media and forwards it on to SIP set D 16a by establishing a two-way media connection between IPB:PBM1 and IPD:PDM1, as depicted via tables 40e and 132c.

Figure 16:
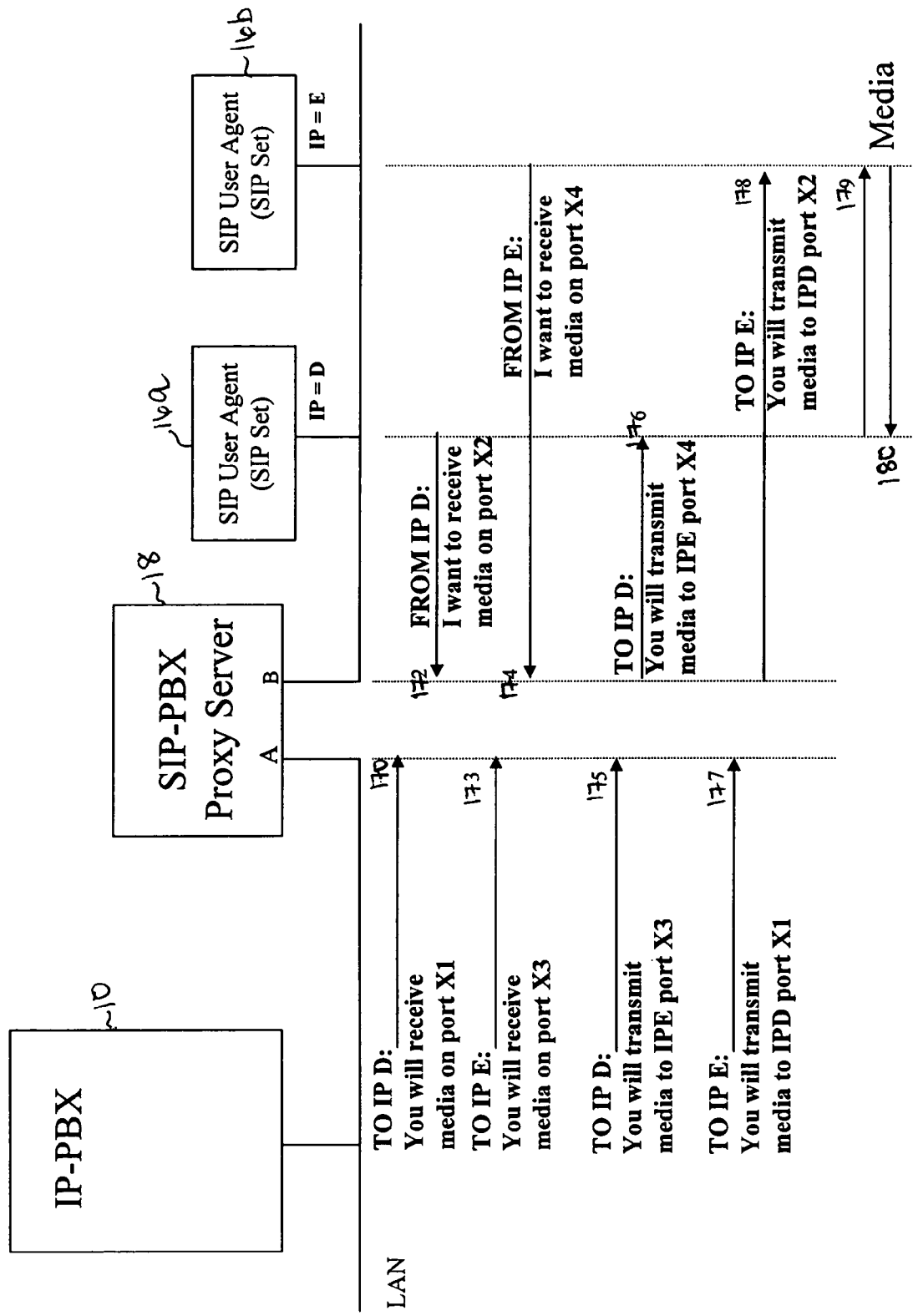
FIG. 16 illustrates a simplified signaling diagram for handling a call between two SIP sets according to one embodiment of the invention.

FIG. 16 illustrates a simplified signaling diagram for handling a call between two SIP sets, SIP set D 16a and SIP set E 16b, according to one embodiment of the invention. Each SIP set 16a, 16b is mapped to a distinct logical IP set maintained by the SIP-PBX proxy server 18. The IP-PBX 10 sets up the media between the two logical IP sets by commanding them, in steps 170 and 173, to receive media on appropriate ports, and in steps 175 and 177, to transmit media on appropriate ports. In steps 172 and 174, each SIP set 16a, 16b transmits the IP address and port on which they prefer to receive their media.

The SIP-PBX Proxy Server reconciles the differences in the ports indicated by the IP-PBX 10 and the ports indicated by the SIP sets 16a, 16b, and transmits the reconciled information to the SIP sets. In the illustrated embodiment, because both SIP sets are serviced by the same SIP-PBX proxy server 18, the server is able to establish the two-way media flow directly between the two SIP sets in steps 179, 180.

Figure 17:
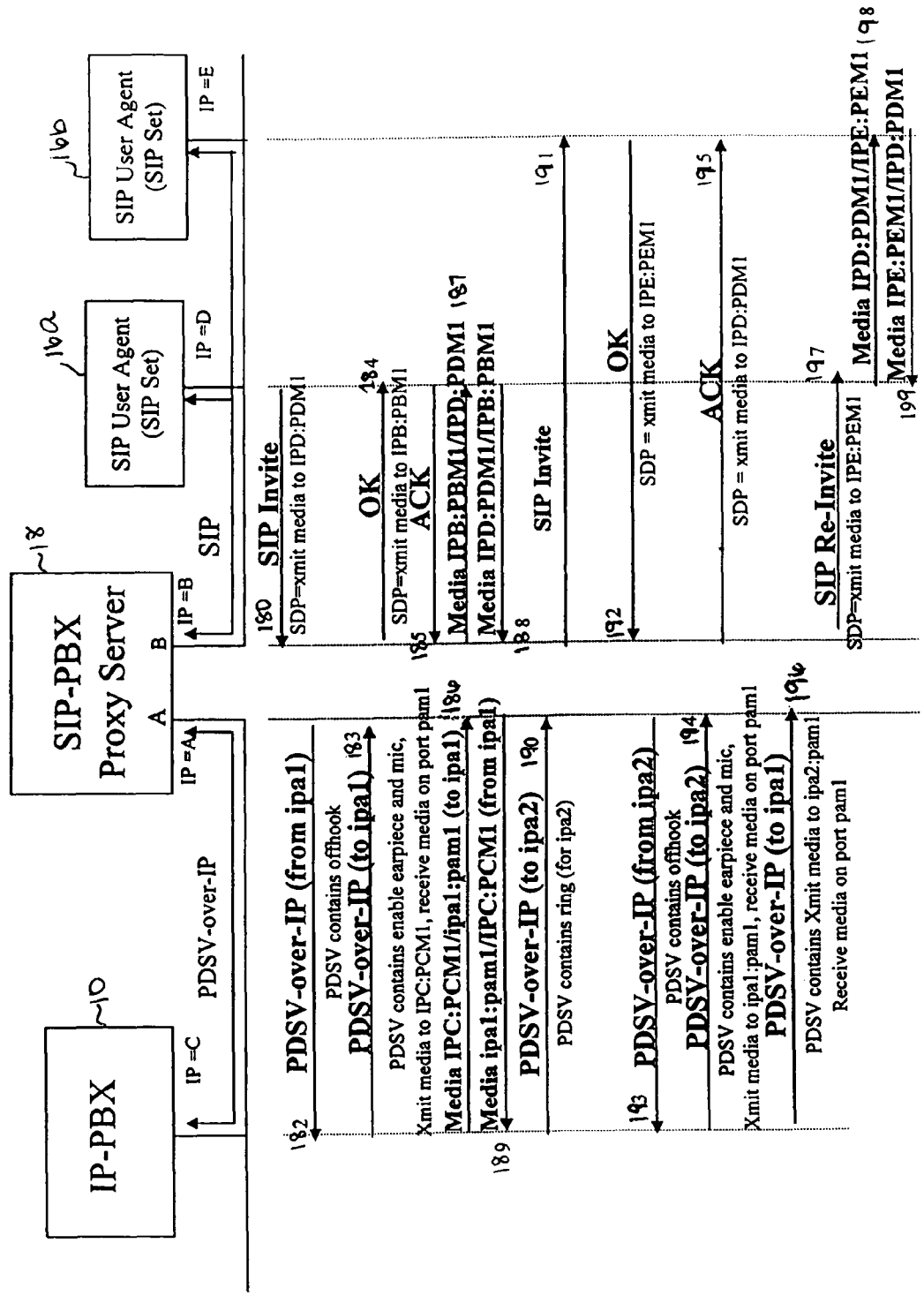
FIG. 17 is a more detailed signaling diagram for handling a call between two SIP sets according to one embodiment of the invention.

FIG. 17 is a more detailed signaling diagram for handling a call by SIP set D 16a to SIP set E 16b according to one embodiment of the invention. In step 180 SIP set D 16a transmits a SIP INVITE message identifying a media port, PDM1, in which SIP set D wishes to receive its media. The SIP-PBX proxy server 18 receives the SIP INVITE message via the second network interface 38, maps SIP set D 16a to a logical IP set 24 (ipa1 in this example), converts the SIP INVITE message to an appropriate PDSV-over-IP message, and transmits the PDSV-over-IP message to the IP-PBX with source address ipa1, in step 182.

In step 183, the IP-PBX 10 transmits an enable earpiece and mic command as a PDSV-over-IP message addressed to ipa1. The IP-PBX 10 further indicates in its message where ipa1 should send its media (IPC:PCM1) and where it should receive its media (pam1). The SIP-PBX proxy server 18 recognizes the earpiece/mic command, maps pam1 to the media port associated with SIP set D (PBM1), and transmits in step 184, a SIP OK message with the mapped media port indicating where SIP set D 16a should send its media. SIP set D responds with a SIP ACK message in step 185. At this point, SIP set D 16a has established a two-media connection with the IP-PBX 10. Media transfer with associated packet address re-labeling then occurs as indicated in steps 186-189.

In step 190, the IP-PBX 10 issues a ring signal to ipa2, which is then passed as an INVITE message to SIP set E 16b in Step 191. SIP set E 16b transmits an OK message in step 192, and in step 193, the SIP-PBX proxy server transmits an offhook command to the IP-PBX 10 with ipa2 as the source address.

In step 194, the IP-PBX 10 commands ipa2 to send its media to ipa1:pam1, and receive its media on port pam1. The SIP-PBX proxy server 18 maps pam1 to the media port associated with SIP set D 16a (PDM1), and in step 195, the SIP-PBX proxy server 18 issues an ACK command to SIP set E indicating that it should send its media to IPD:PDM1.

In step 196, the IP-PBX 10 commands ipa1 to send its media to ipa2:pam1, and receive its media on port pam1. The SIP-PBX proxy server 18 re-INVITES SIP set D in step 197, informing it that it should its media to IPE:PEM1 (which it knows from the OK received in step 192).

In steps 197 and 198, two-way media flows from SIP set D 16a to SIP Set E 16b, even though the IP-PBX 10 thinks it has setup two-way media flow from logical IP set ipa1 to logical IP set ipa2. According to the illustrated embodiment, there is no need for the SIP-PBX proxy server to send the media between two of its internal logical sets.

Figure 18:
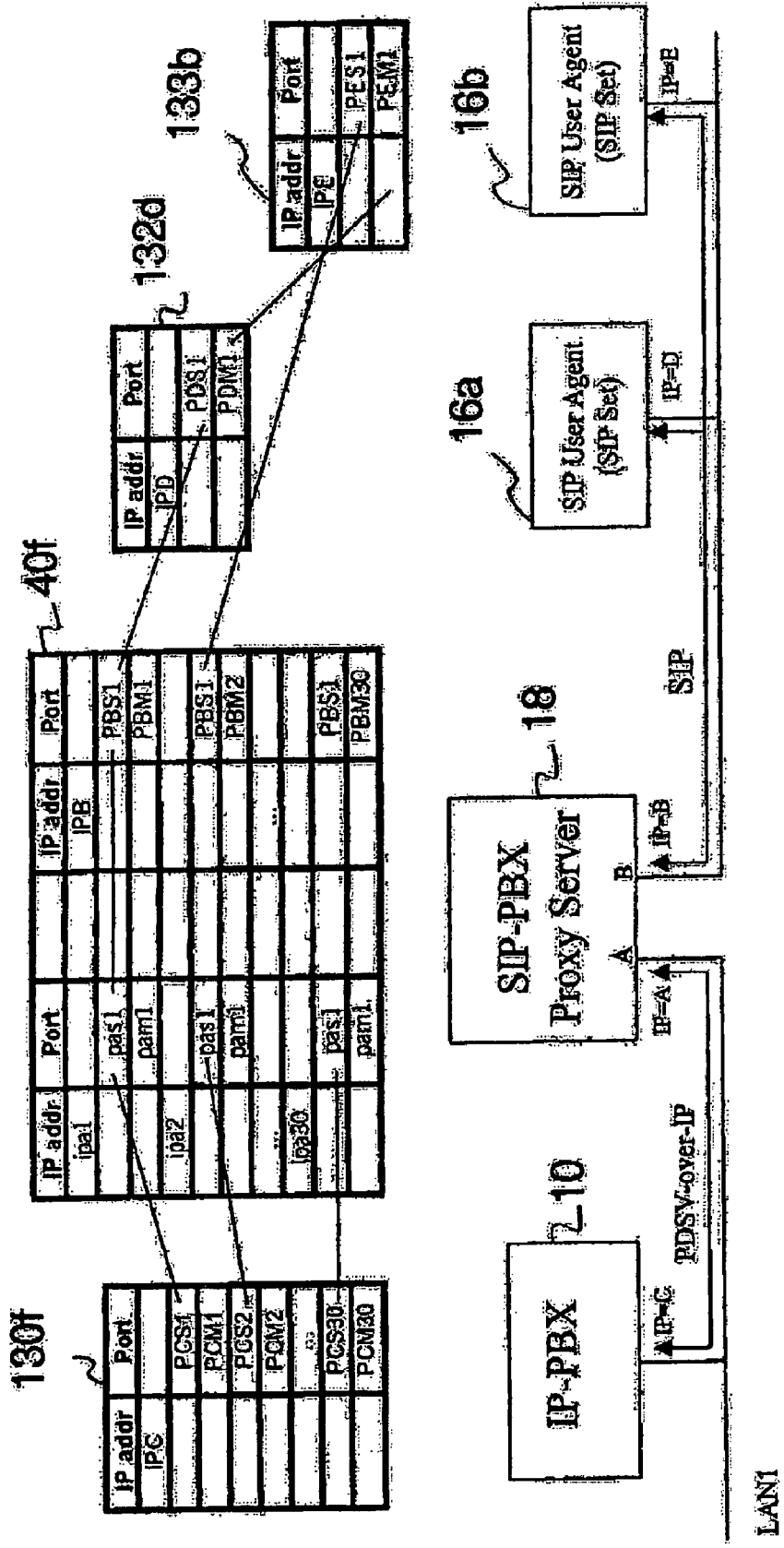
FIG. 18 is a schematic block diagram illustrating the connections made based on the exchange of signals in FIG. 17 according to one embodiment of the invention.

FIG. 18 is a schematic block diagram illustrating the connections made based on the exchange of signals in FIG. 17 according to one embodiment of the invention. As is illustrated in this embodiment, the media flows directly between the two SIP sets. The media flow is on IPD:PDM1/IPE: PEM1, as is illustrated via tables 132d and 133b, even though the IP-PBX believes it has established the media flow on ipa1:pam1/ipa2:pam2, as is illustrated via tables 130f and 40f.

In the embodiment illustrated in FIG. 17, the SIP-PBX proxy server contains the logic to reconcile the media flow by appropriately re-INVITEing one of the SIP sets as illustrated in step 197. Media packet processing is therefore not necessary in the embodiment illustrated in FIG. 17, helping improve the performance of the SIP-PBX proxy server 18. However, this method of reconciliation applies to SIP sets that are associated with the same SIP-PBX proxy server.

Figure 19:
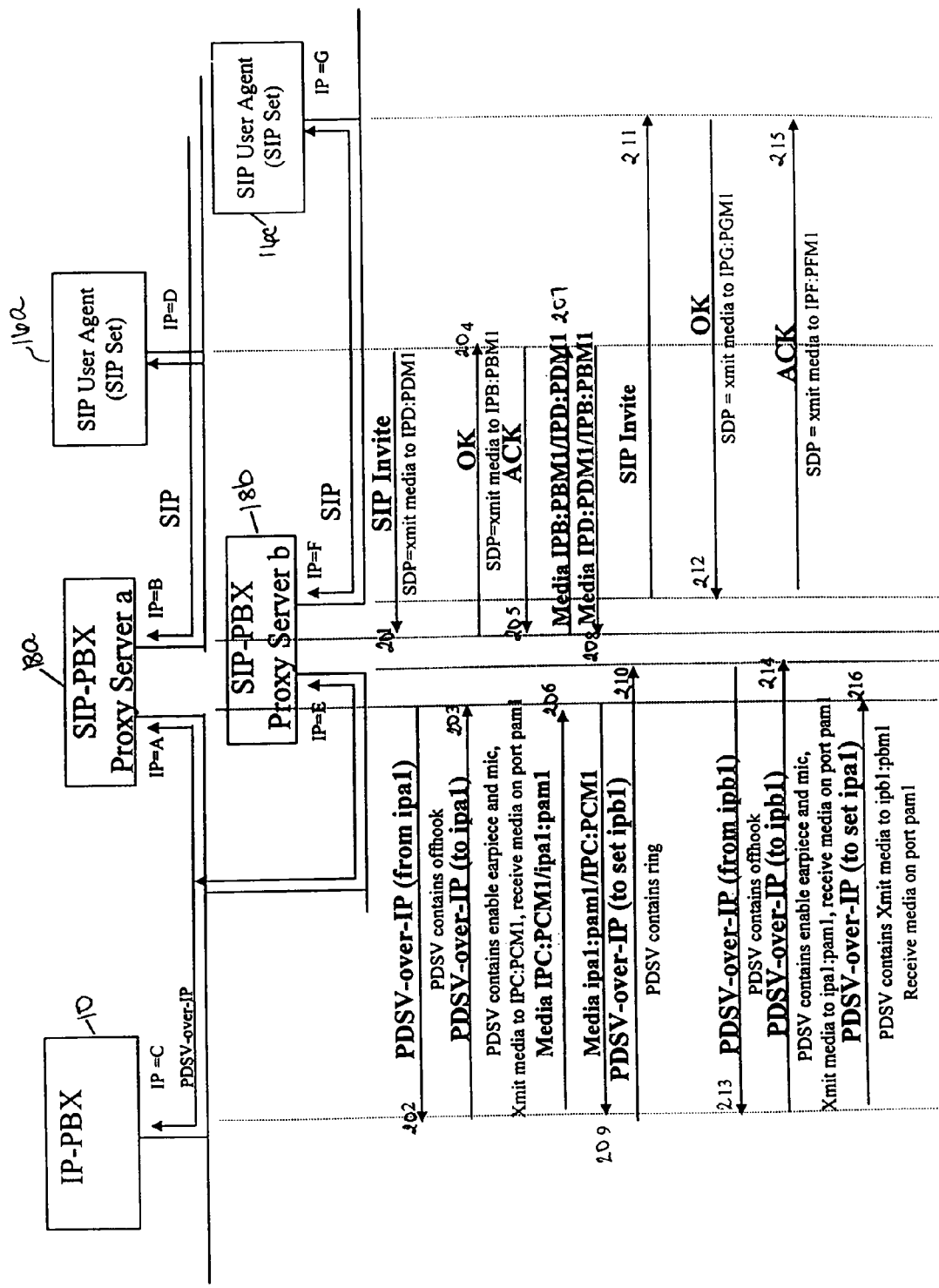
FIG. 19 is a signaling diagram for handling a call between SIP sets that are not associated with a same SIP-PBX proxy server according to one embodiment of the invention.
Figure 20A:
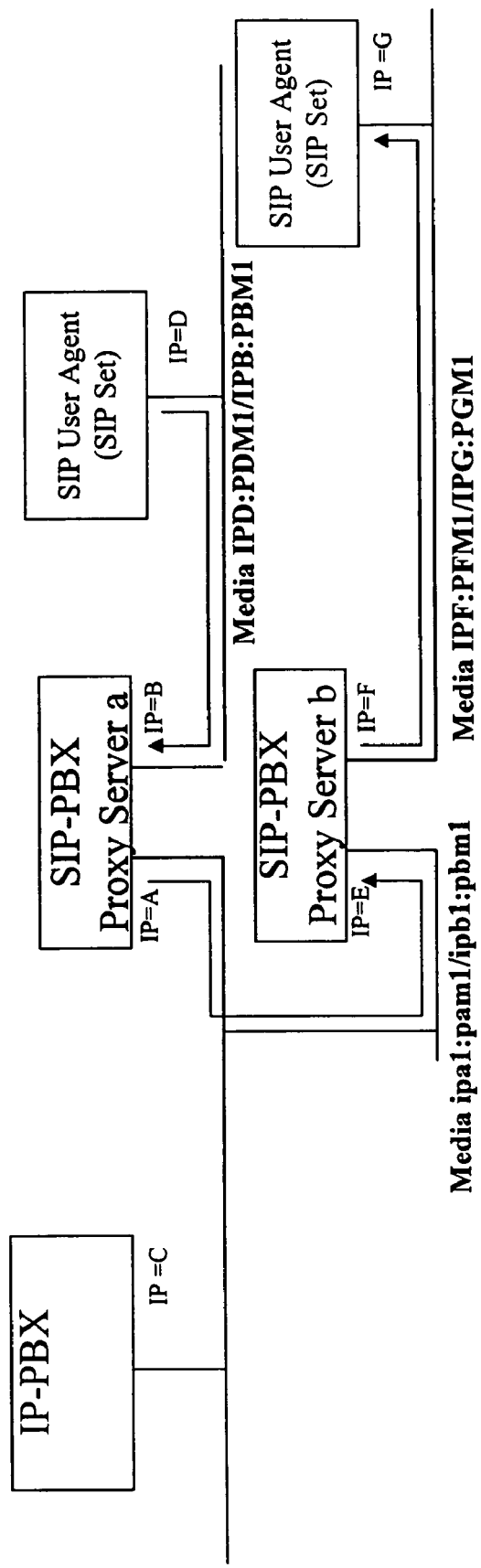
FIGS. 20A-20B illustrate media reconciliation performed by the SIP-PBX proxy servers of FIG. 19 according to one embodiment of the invention.
Figure 20B:
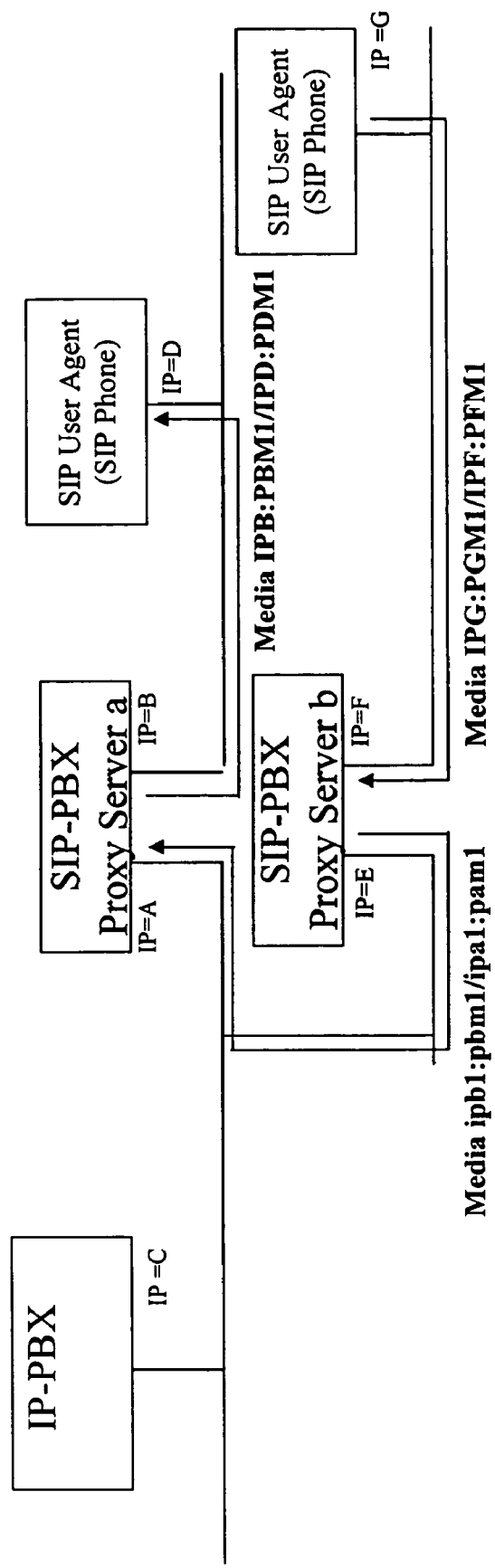

FIG. 19 is a signaling diagram for handling a call between SIP sets that are not associated with the same SIP-PBX proxy server according to one embodiment of the invention. In the illustrated embodiment, SIP set D 16a is associated with SIP-PBX-proxy server A 18a while SIP set G 16c is associated with SIP-PBX Proxy Server B 18b. The signaling exchanged between the various devices is illustrated in steps 201-216. Because the SIP sets are not associated with the same SIP-PBX proxy server, media reconciliation is performed by rewriting packet headers, as is illustrated in FIGS. 20A-20B. This presumes that the SIP-PBX proxy servers do not exchange information about their corresponding SIP sets. In other words, a presumption is made that SIP-PBX proxy server A 18a does not know the IP address and port on which SIP set G 16c prefers to receive its media. In the same manner, a presumption is made that SIP-PBX proxy server B 18b does not know the IP address and port on which SIP set D 16a prefers to receive its media.

Figure 21:
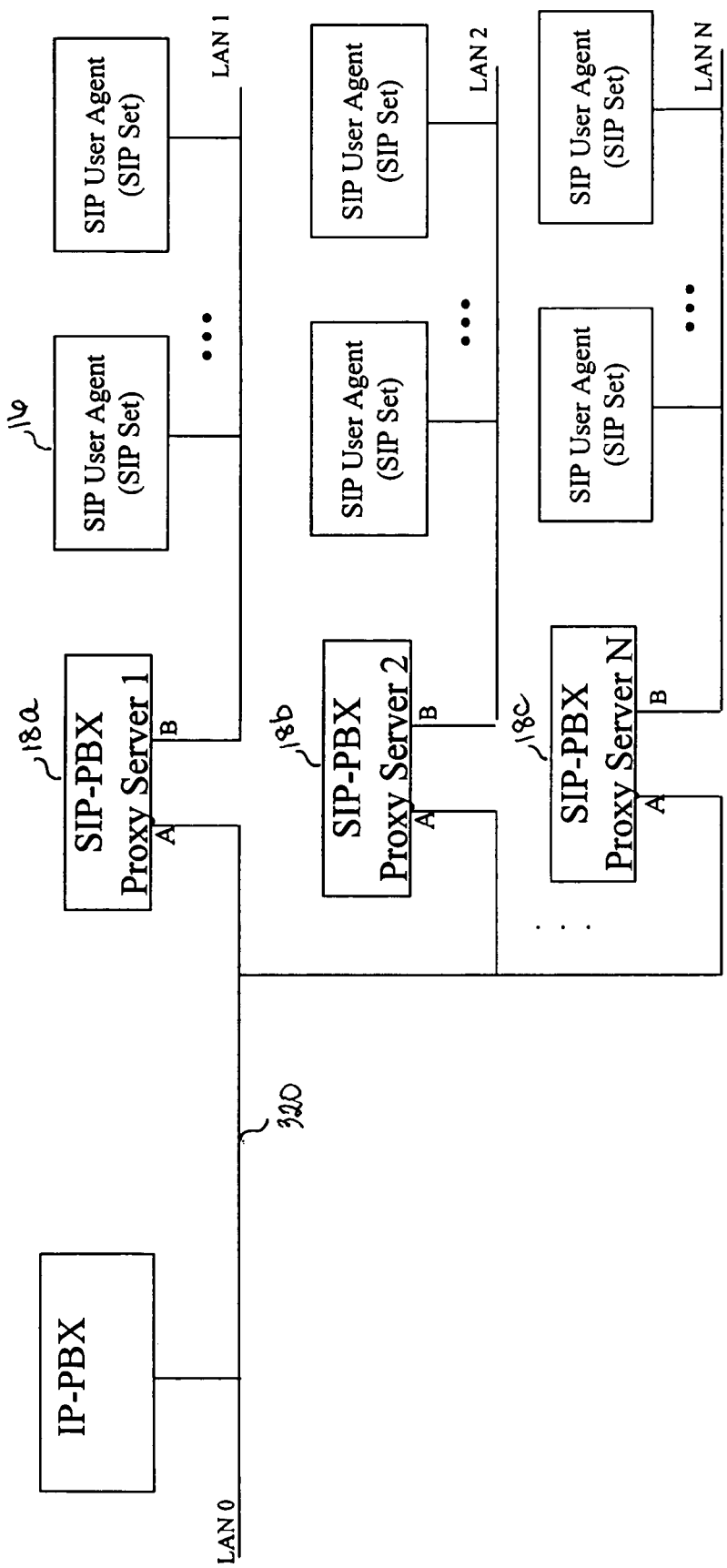
FIG. 21 is a schematic block diagram of a data communications system including multiple SIP-PBX proxy servers according to one embodiment of the invention.

FIG. 21 is a schematic block diagram of a data communication system including multiple SIP-PBX proxy servers 18a-18c according to one embodiment of the invention. Multiple SIP-PBX proxy servers allow the accommodation of a larger number of SIP sets 16. The SIP sets associated with each server may be mapped to a logical IP set via either static or dynamic mapping. In the illustrated embodiment, all of the servers 18a-18c have their port A on the same LAN segment 320.

Figure 22:
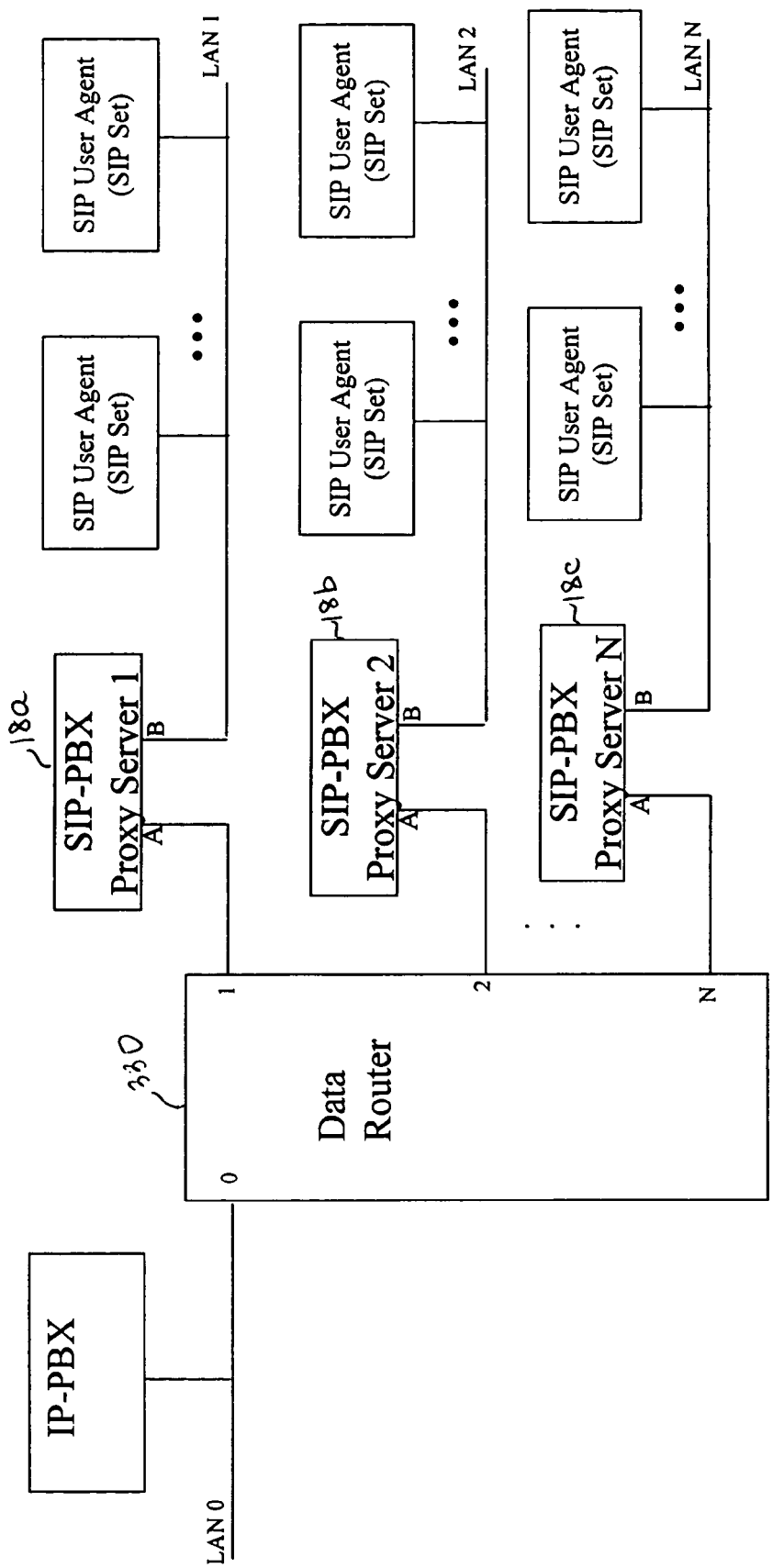
FIG. 22 is a schematic block diagram of a data communications system including multiple SIP-PBX proxy servers according to another embodiment of the invention.

FIG. 22 is a schematic block diagram of a data communications system including multiple SIP-PBX proxy servers 18a-18c according to another embodiment of the invention. This embodiment is similar to the embodiment illustrated in FIG. 21, except that it includes a data router 330 that is coupled to the various SIP-PBX proxy servers 18a-18c. The data router 330 performs distribution of media and signaling traffic transmitted by the SIP-PBX proxy servers 18a-18c, allowing a reduction of such traffic on port A of each SIP-PBX proxy server.

Figure 23:
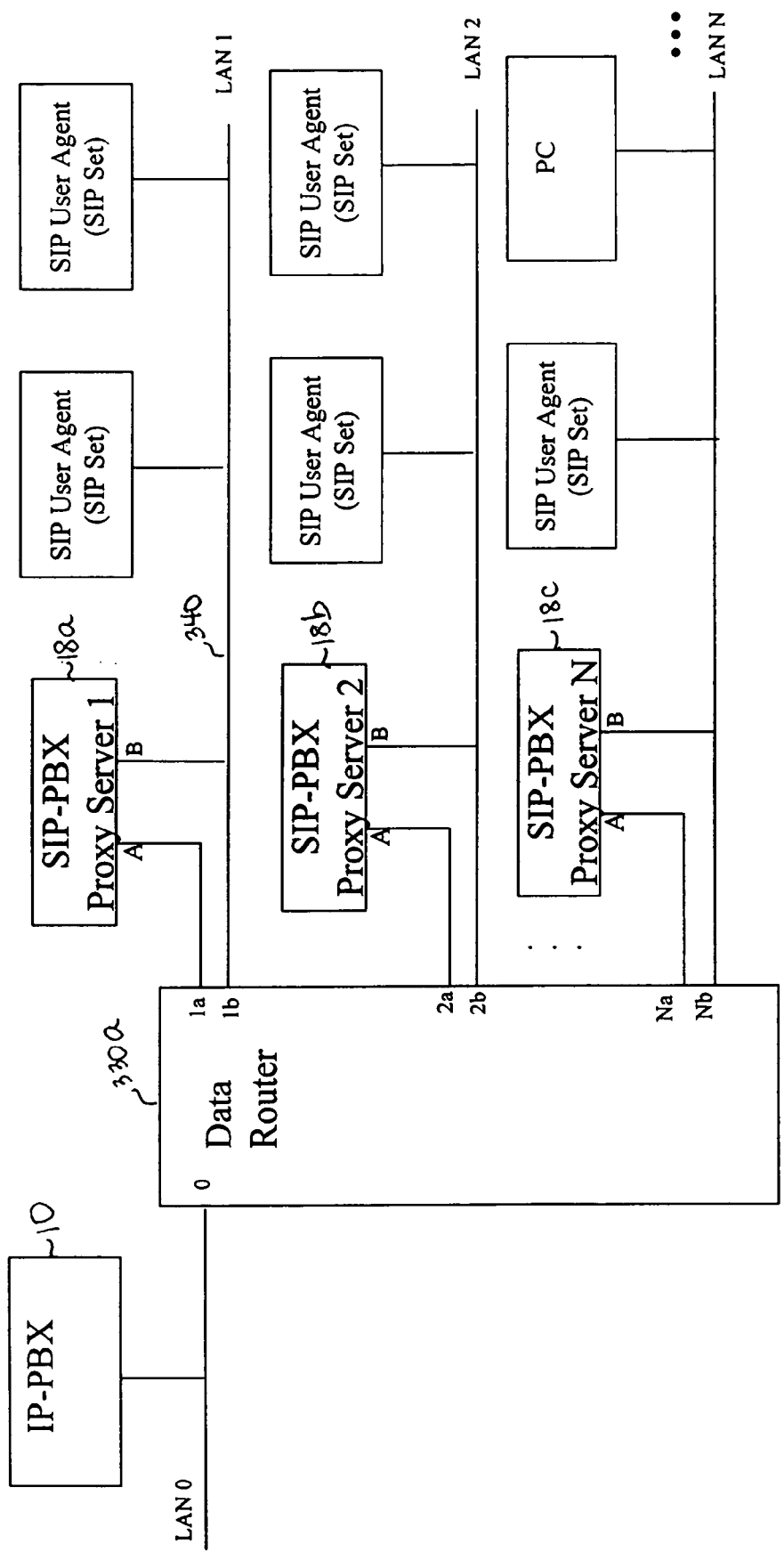
FIG. 23 is a schematic block diagram of a data communications system including multiple SIP-PBX proxy servers according to a further embodiment of the invention.

FIG. 23 is a schematic block diagram of a data communications system including multiple SIP-PBX proxy servers 18a-18c according to a further embodiment of the invention. This embodiment is similar to the embodiment illustrated in FIG. 22, except that a LAN segment 340 attached to Port B of each SIP-PBX proxy server 18a-18c can also be folded back into a data router 330a. This architecture is helpful when devices on the port B LAN segments 340 need to access other enterprise resources in addition to the IP-PBX 10. For example, if one of the SIP sets 16 takes the form of a PC-based SIP client, such as Microsoft's Windows Messenger, the PC may also need access to e-mail, corporate web servers, and the like. In the illustrated architecture, SIP-related traffic transits through the SIP-PBX proxy server 18a-18c, while all other traffic enters the router 330a directly.

Figure 24:
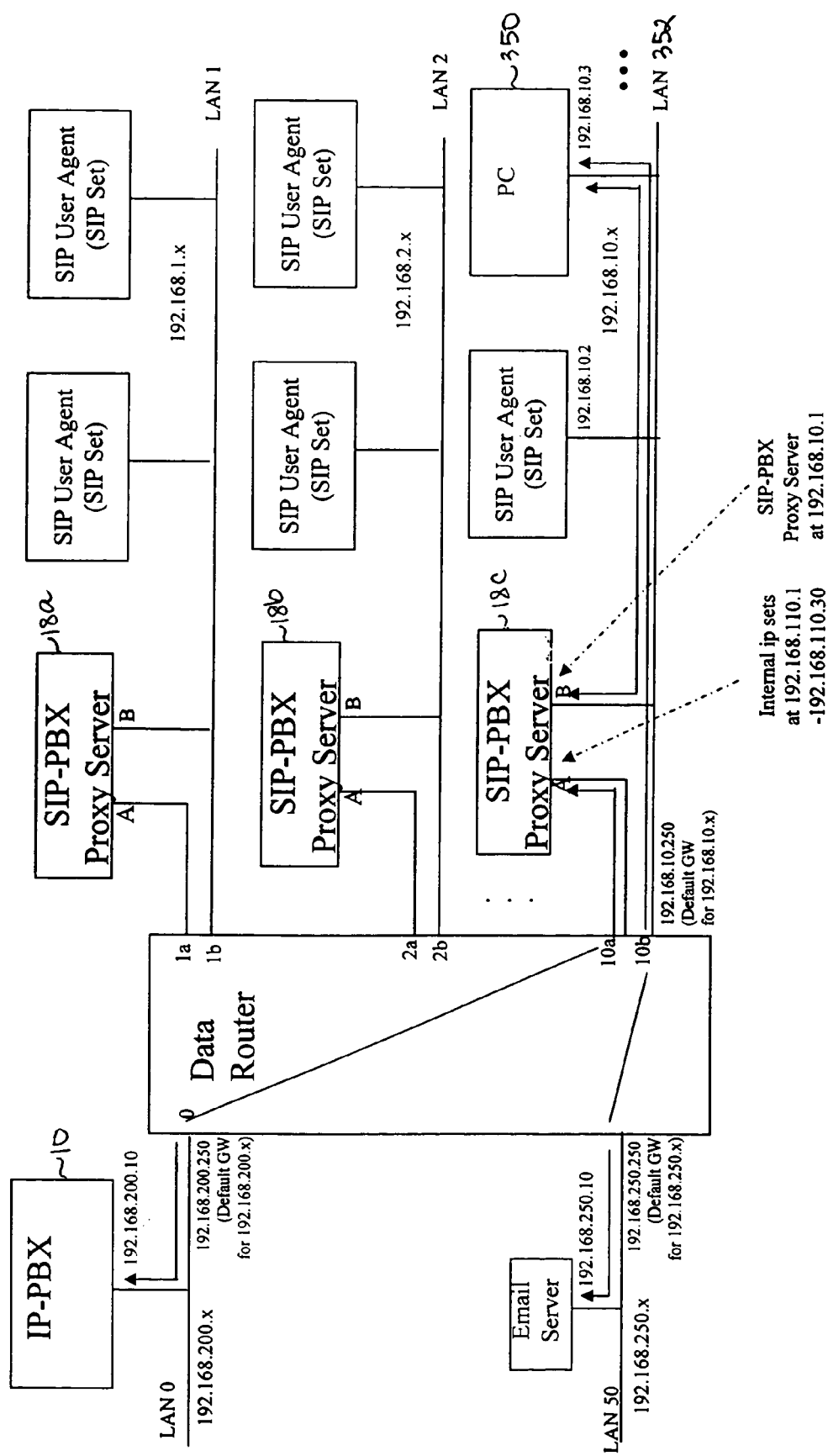
FIG. 24 is a schematic block diagram depicting traffic flow in the data communications system of FIG. 23 according to one embodiment of the invention.

FIG. 24 is a schematic block diagram depicting traffic flow in the data communications system of FIG. 23 according to one embodiment of the invention. In this illustration, a PC on LAN 352 has registered with SIP-PBX proxy server 18c at address 192.168.10.1. All of its SIP signaling and media pass through this address to the IP-PBX 10. However, PC 350 is also able to access e-mail. According to the illustrated embodiment, the e-mail traffic does not pass through the SIP-PBX proxy server.

Figure 25:
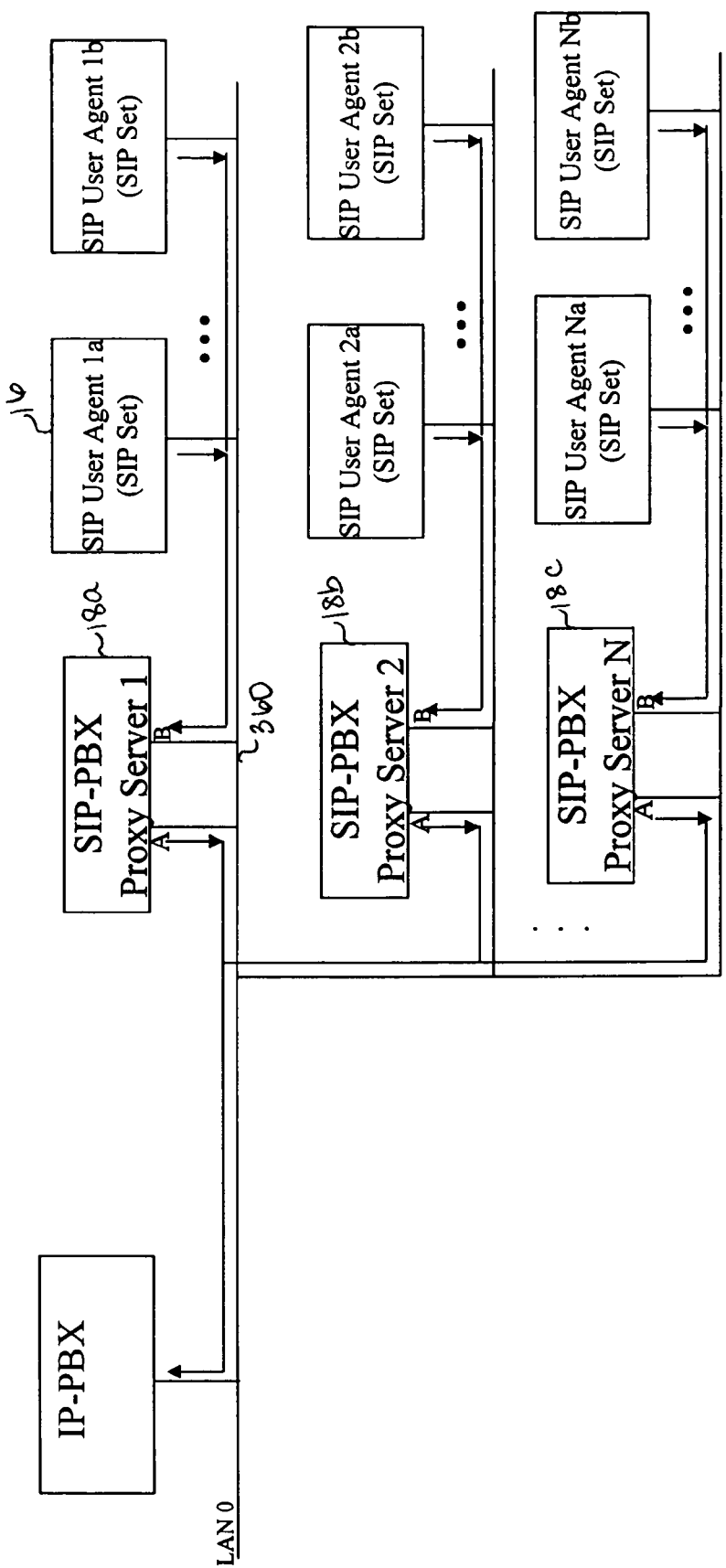
FIG. 25 is a schematic block diagram of a data communications system including multiple SIP-PBX proxy servers according to another embodiment of the invention.

FIG. 25 is a schematic block diagram of a data communications system including multiple SIP-PBX proxy servers 18a-18c according to another embodiment of the invention. According to this embodiment, both ports A and B of a SIP-PBX proxy server 18a are attached to the same LAN 360. This allows the various SIP devices 16 to directly access the corporate LAN 360 to send/retrieve e-mail, and the like. SIP traffic and IP-PBX traffic, however, are exchanged through the SIP-PBX proxy server ports.

Figure 26:
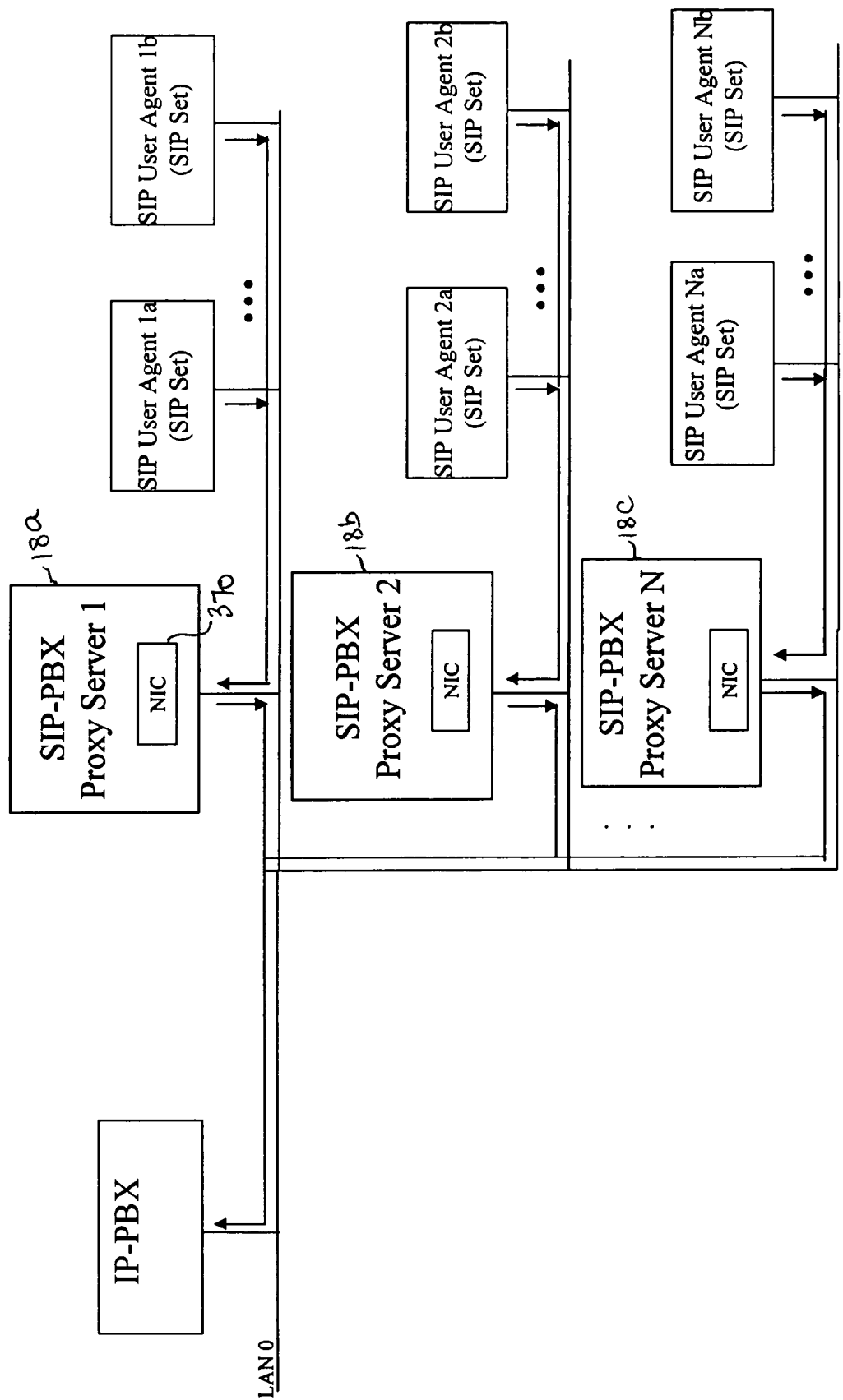
FIG. 26 is a schematic block diagram of a data communications system including multiple SIP-PBX proxy servers according to another embodiment of the invention.

FIG. 26 is a schematic block diagram of a data communications system including multiple SIP-PBX proxy servers 18a-18c according to another embodiment of the invention. This embodiment is similar to the embodiment illustrated in FIG. 25 except that the SIP-PBX proxy server 18a has a single network interface card (NIC) 370. The media access controller (MAC) address for the NIC, however, has multiple IP addresses for logical IP sets, management, SIP proxying, and the like.

Figure 27:
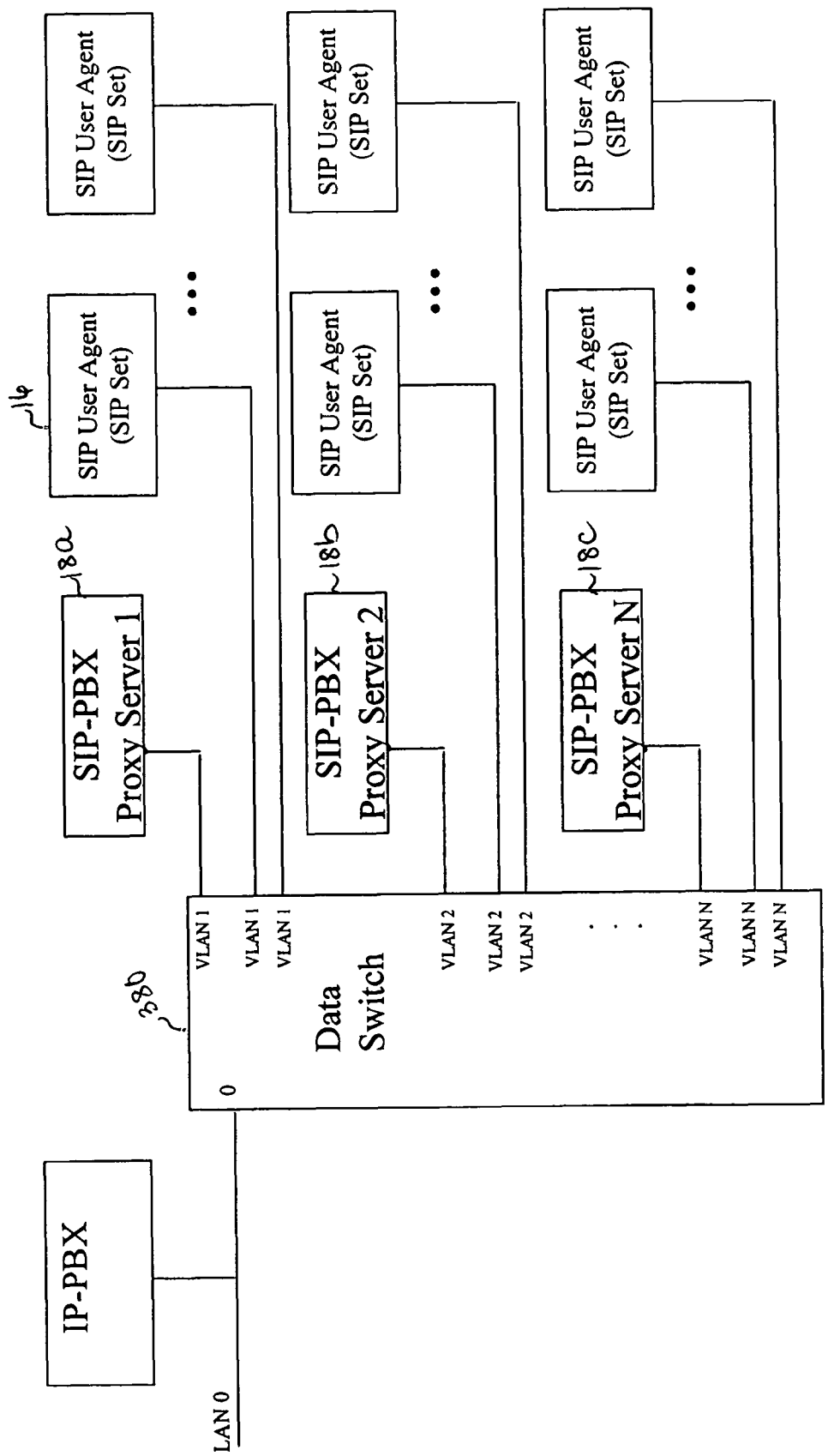
FIG. 27 is a schematic block diagram of a data communications system including multiple SIP-PBX proxy servers according to another embodiment of the invention.

FIG. 27 is a schematic block diagram of a data communications system including multiple SIP-PBX proxy servers 18a-18c according to another embodiment of the invention. This embodiment is similar to the embodiment illustrated in FIG. 26 except that it includes a data switch 380 that segments the traffic to and from the SIP Sets 16 and SIP-PBX proxy servers 18a-18c. This embodiment also allows the configuration of virtual local area networks (VLANs).

Figure 28:
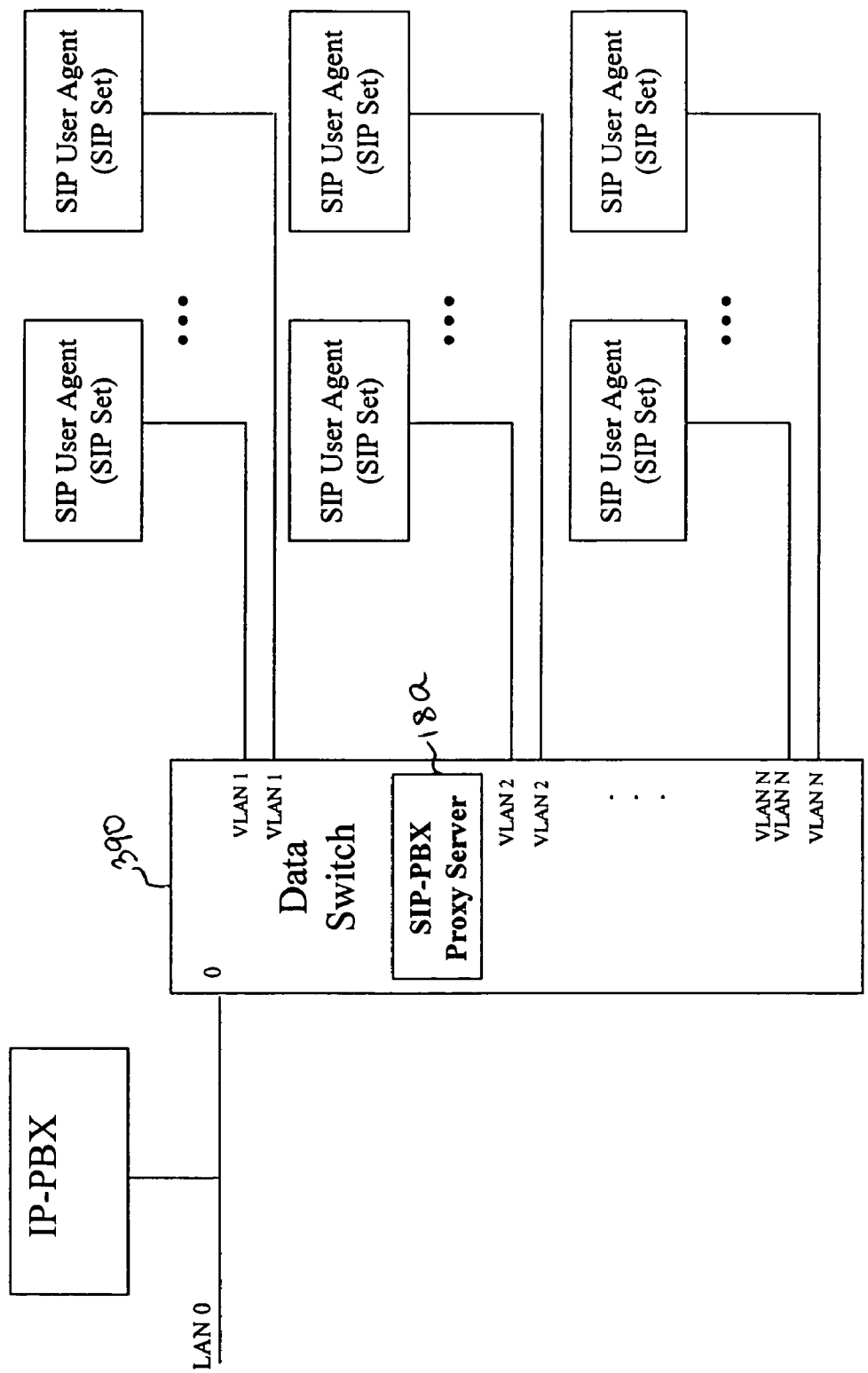
FIG. 28 is a schematic block diagram of a data communications system with an embedded SIP-PBX proxy server according to one embodiment of the invention.

FIG. 28 is a schematic block diagram of a data communications system with an embedded SIP-PBX proxy server 18a according to one embodiment of the invention. According to this embodiment, the SIP-PBX proxy server 18a is embedded within a data switch or router 390.

Figure 29:
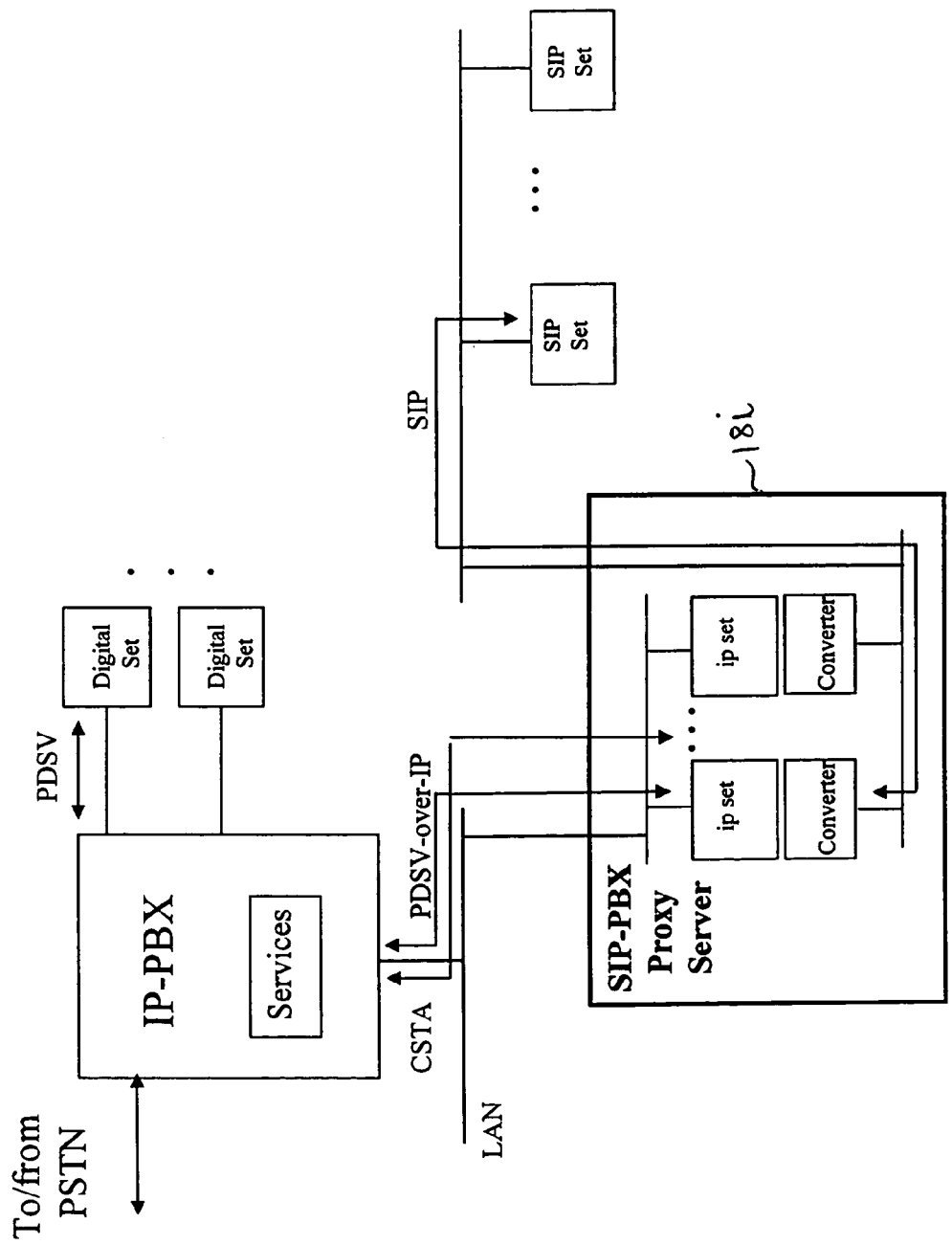
FIG. 29 is a schematic block diagram of a data communications system using computer supported telephony applications (CSTA) protocol and PDSV-over-IP messages according to one embodiment of the invention.

FIG. 29 is a schematic block diagram of a data communications system using computer supported telephony applications (CSTA) and PDSV-over-IP messages according to one embodiment of the invention. According to this embodiment, both PDSV-over-IP and CSTA messages are used to enable a SIP-PBX proxy server 18i to perform its functions. This allows certain functions that are more suitable to be performed with CSTA commands to be performed using such computer telephony integration (CTI) commands rather than PDSV-over-IP commands. For example, when the SIP-PBX proxy server 18i initiates an outbound call based on a SIP INVITE message, uses a CSTA command to dial the number rather than synthesizing a series of PDSV keypresses.

According to one embodiment of the invention, the IP-PBX 10 typically contains one or more digital signal processing (DSP) boards that perform VoIP conversion to/from TDM within the switch. The logical IP sets within the SIP-PBX proxy server consume these DSP resources for TDM-packet conversion during the flow of VoIP media. Because the resources can generally support a limited number of VoIP channels, their allocation becomes an issue.

Figure 30A:
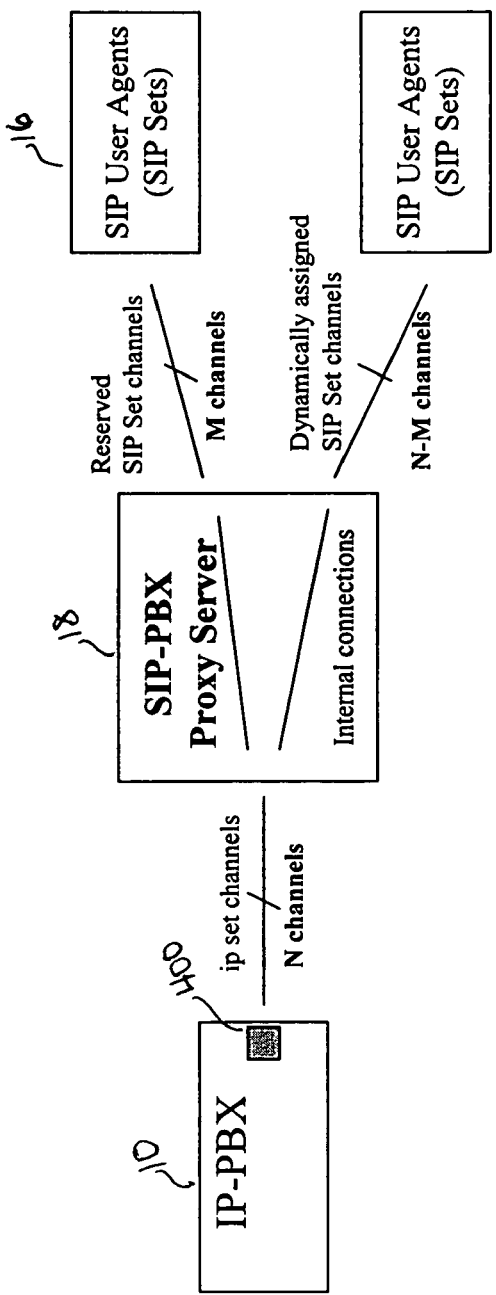
FIG. 30A is an exemplary block diagram illustrating the allocation of digital signal processing (DSP) resources when a single DSP board is included in an IP-PBX according to one embodiment of the invention.

FIG. 30A is an exemplary block diagram illustrating the allocation of DSP resources when a single DSP board 400 is included in the IP-PBX 10 according to one embodiment of the invention. In the illustrated embodiment, the single DSP board 400 has allocated all of its resources to the logical IP sets within the SIP-PBX proxy server 18. The SIP-PBX proxy server 18 then distributes the channels between static and dynamic SIP sets 16. For example, if the single DSP board 400 supports N=30 logical IP sets, the SIP-PBX proxy server 18 may statically map M=30 logical IP sets to thirty SIP sets 16. Alternately, the SIP-PBX proxy server 18 may statically map M=10 logical IP sets to ten SIP sets 16, and then share the remaining N−M=20 logical IP sets dynamically among an arbitrary number of additional SIP sets.

Figure 30B:
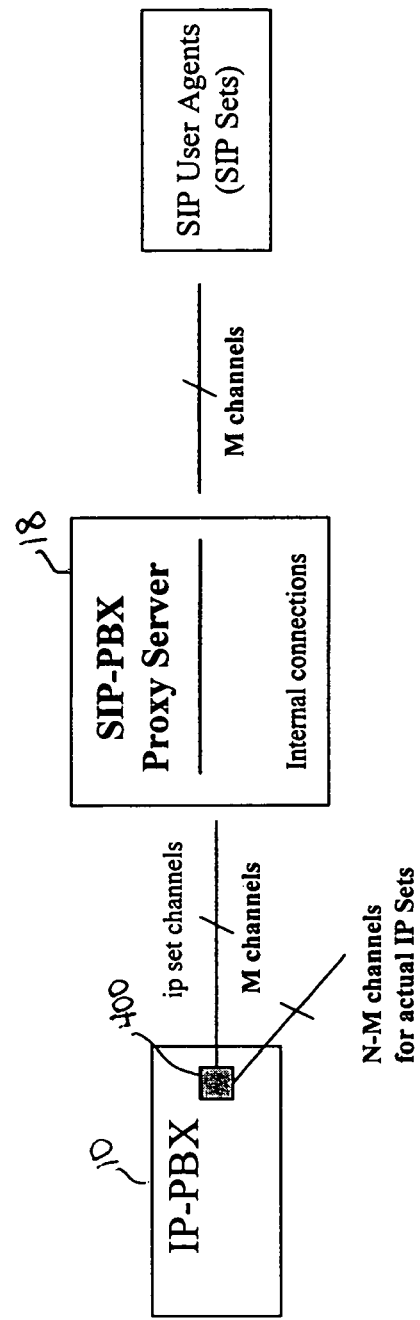
FIG. 30B is an exemplary block diagram illustrating the allocation of DSP resources when a single DSP board is included in an IP-PBX according to another embodiment of the invention.

FIG. 30B is an exemplary block diagram illustrating the allocation of DSP resources when a single DSP board 400 is included in the IP-PBX 10 according to another embodiment of the invention. This embodiment is similar to the embodiment illustrated in FIG. 30A, except that the DSP resources are apportioned between the logical IP sets within the SIP-PBX proxy server 18 and actual physical IP sets 14 (FIG. 1). For example, if the single DSP board 400 within the IP-PBX 10 supports N=30 channels, it may allocate M=20 of these channels to the logical IP sets within the SIP-PBX proxy server 18, and the remaining N−M=10 channels to actual IP sets 14.

Figure 31A:
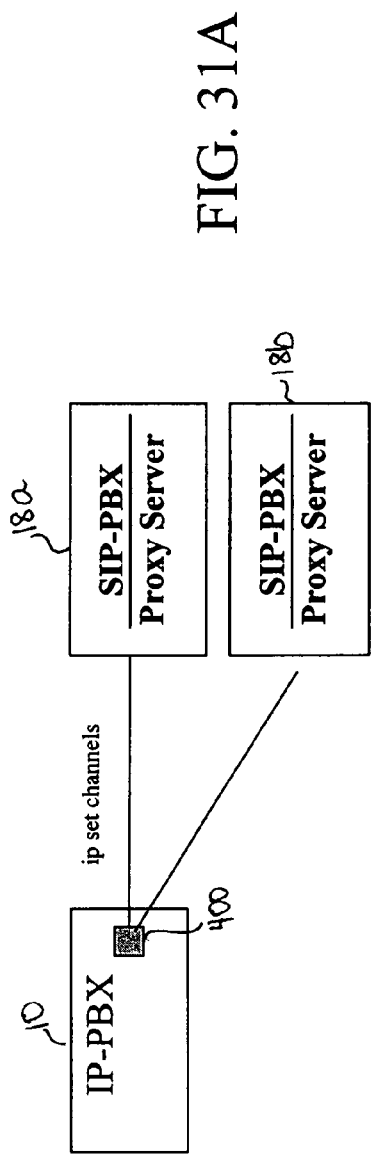
FIGS. 31A-31C are exemplary block diagrams illustrating the allocation of DSP resources when multiple DSP boards are included into an IP-PBX according to one embodiment of the invention.
Figure 31B:
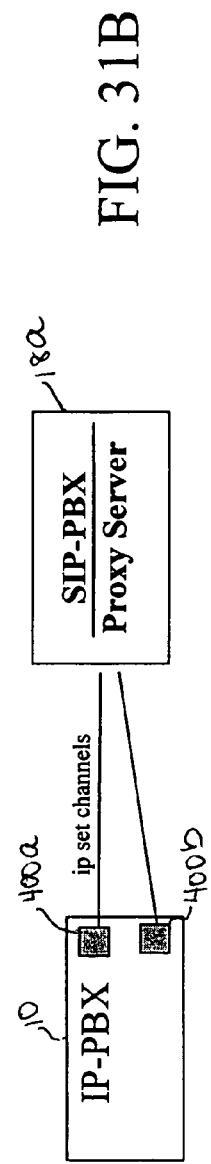
Figure 31C:
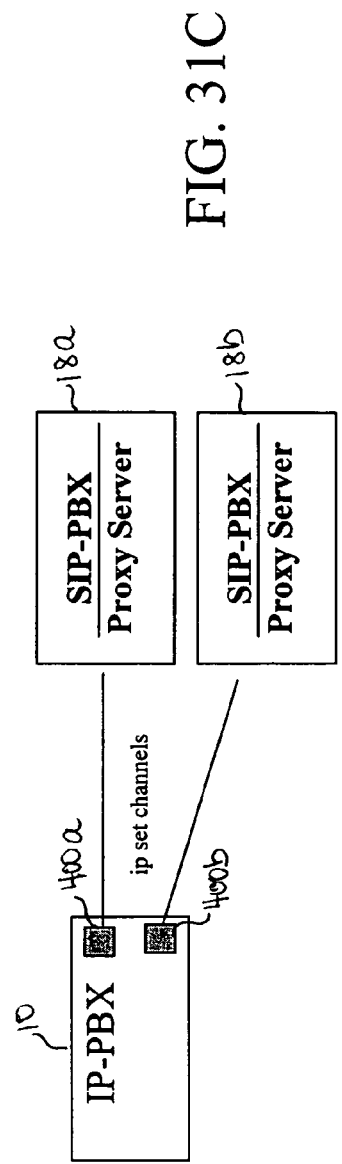

FIGS. 31A-31C are exemplary block diagrams illustrating the allocation of DSP resources when multiple DSP boards are included into the IP-PBX 10 according to one embodiment of the invention. As illustrated in FIG. 31A, DSP channels from a single DSP board 400 may be allocated among multiple SIP-PBX proxy servers 18a-18b. As illustrated in FIG. 31B, DSP channels from multiple DSP boards 400a, 440b may be allocated to a single SIP-PBX proxy server 18a. As is illustrated in FIG. 31C, and DSP channels from multiple DSP boards 400a, 400b may be allocated to multiple SIP-PBX proxy servers 18a, 18b.

Although this invention has been described in certain specific embodiments, those skilled in the art will have no difficulty devising variations to the described embodiment which in no way depart from the scope and spirit of the present invention. For example, although SIP is used as an exemplary protocol that utilizes a peer-to-peer mode of handling voice media, a person of skill in the art should recognize that any other protocol that also utilizes a peer-to-peer mode may be used instead of SIP. Furthermore, a person of skill in the art should recognize that other private and signaling protocols instead of PDSV may also be used to communicate with the IP-PBX.

Moreover, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A data communications system integrating a voice switch adhering to a first protocol with a network of one or more first devices adhering to a second protocol, the system comprising:

a server coupled to the voice switch and the network of one or more first devices, the server maintaining for each of said at least one of the first devices a separate logical IP address that is different from and maps to an IP address of each of the at least one of the first devices connected to the server, the server further receiving media directed to at least one of the logical IP addresses at a converter within the server wherein the converter consults a mapping table to ascertain the IP address of the one or more first devices that corresponds with the at least one of the logical IP addresses and redirects the media to the corresponding first device and wherein the converter converts the media from the first protocol to the second protocol.

2. The system of claim 1, wherein the first protocol is a private signaling and voice protocol.

3. The system of claim 1, wherein the second protocol is a session initiation protocol (SIP).

4. A method for integrating a voice switch adhering to a first protocol with a network of one or more devices adhering to a second protocol, the method comprising:

receiving from the voice switch a first message indicative of a first communication port to be used by a particular device for receiving media;

maintaining for each of the one or more devices a separate logical IP address that is different from and maps to an IP address for each of the one or more devices;

receiving from the particular device a second message indicative of a second communication port to be used by the particular device for receiving the media; and reconciling a difference between the first communication port and the second communication port using a mapping table wherein a converter also consults the mapping table to ascertain the IP address of the particular device that corresponds with the separate logical IP address for the particular device.

5. The method of claim 4, wherein the reconciling of the difference further comprises:

mapping the first communication port to the second communication port;

receiving media addressed to the first communication port; and redirecting the media to the second communication port.

6. The method of claim 5, wherein the mapping statically allocates the first communication port to the second communication port.

7. The method of claim 5, wherein the mapping dynamically allocates the first communication port to the second communication port.

8. The method of claim 5 further comprising translating media transmitted to the first communication port according to the first protocol to media adhering to the second protocol at the converter, wherein the redirecting of the media comprises redirecting the media adhering to the second protocol to the second communication port after the converter consults the mapping table.

9. The method of claim 4, wherein the first protocol is a private signaling and voice protocol.

10. The method of claim 4, wherein the second protocol is a session initiation protocol (SIP).

* * * * *